(12) United States Patent
Fukuba et al.

(10) Patent No.: US 9,286,497 B2
(45) Date of Patent: Mar. 15, 2016

(54) IMAGE READING DEVICE CAPABLE OF PRODUCING ILLUMINATION INCLUDING A CONTINUOUS, LOW-INTENSITY LEVEL ILLUMINATION COMPONENT AND ONE OR MORE PULSED, HIGH-INTENSITY LEVEL ILLUMINATION COMPONENTS

(75) Inventors: Ken Fukuba, Saitama Pref. (JP); Yasutake Kawashima, Saitama Pref. (JP)

(73) Assignees: Optoelectronics Co., Ltd., Saitama (JP); Opticon, Inc., Renton, WA (US)

( * ) Notice: Subject to any disclaimer, the term of this patent is extended or adjusted under 35 U.S.C. 154(b) by 0 days.

(21) Appl. No.: 14/378,892

(22) PCT Filed: Mar. 23, 2012

(86) PCT No.: PCT/US2012/030347
§ 371 (c)(1),
(2), (4) Date: Nov. 5, 2014

(87) PCT Pub. No.: WO2013/141876
PCT Pub. Date: Sep. 26, 2013

(65) Prior Publication Data
US 2015/0076232 A1    Mar. 19, 2015

(51) Int. Cl.
G06K 7/10    (2006.01)
G06K 7/14    (2006.01)

(52) U.S. Cl.
CPC ........ *G06K 7/10732* (2013.01); *G06K 7/10574* (2013.01); *G06K 7/10584* (2013.01); *G06K 7/10722* (2013.01); *G06K 7/10752* (2013.01); *G06K 7/10851* (2013.01); *G06K 7/1439* (2013.01); *G06K 2207/1018* (2013.01)

(58) Field of Classification Search
CPC .......... G06K 7/10732; G06K 7/10752; G06K 2207/1018; G06K 7/10851; G06K 7/10574
See application file for complete search history.

(56) References Cited

U.S. PATENT DOCUMENTS

| | | | |
|---|---|---|---|
| 7,433,590 B2 * | 10/2008 | Freyman | 396/157 |
| 2001/0055422 A1 | 12/2001 | Roustaei | |
| 2006/0113386 A1 * | 6/2006 | Olmstead | 235/454 |
| 2006/0202038 A1 * | 9/2006 | Wang et al. | 235/462.24 |
| 2009/0001163 A1 * | 1/2009 | Barkan et al. | 235/454 |
| 2009/0001170 A1 | 1/2009 | He | |
| 2009/0032600 A1 | 2/2009 | Lapstun et al. | |
| 2009/0159684 A1 | 6/2009 | Barber et al. | |
| 2009/0166543 A1 | 7/2009 | Vinogradov | |
| 2010/0096459 A1 * | 4/2010 | Gurevich | 235/455 |
| 2012/0111947 A1 * | 5/2012 | Nubling et al. | 235/470 |
| 2012/0168507 A1 * | 7/2012 | Jovanovski et al. | 235/455 |

OTHER PUBLICATIONS

Examiner: Blaine R. Copenheaver, "Related International Application No. PCT/US2012/030347", "International Search Report and Written Opinion", Jun. 20, 2012, Publisher: PCT—International Search Authority, Published in: US.

\* cited by examiner

*Primary Examiner* — Christopher Stanford
(74) *Attorney, Agent, or Firm* — Brundidge & Stanger, P.C.

(57) ABSTRACT

An image reading device includes an illumination system and a processor that causes the illumination system to produce illumination according to an illumination period having a continuous or substantially continuous, illumination sub-period and at least one pulsed, illumination sub-period. The illumination period allows the image reading device to determine a proper exposure for imaged indicia by sectioning a single frame into individual exposures.

6 Claims, 27 Drawing Sheets

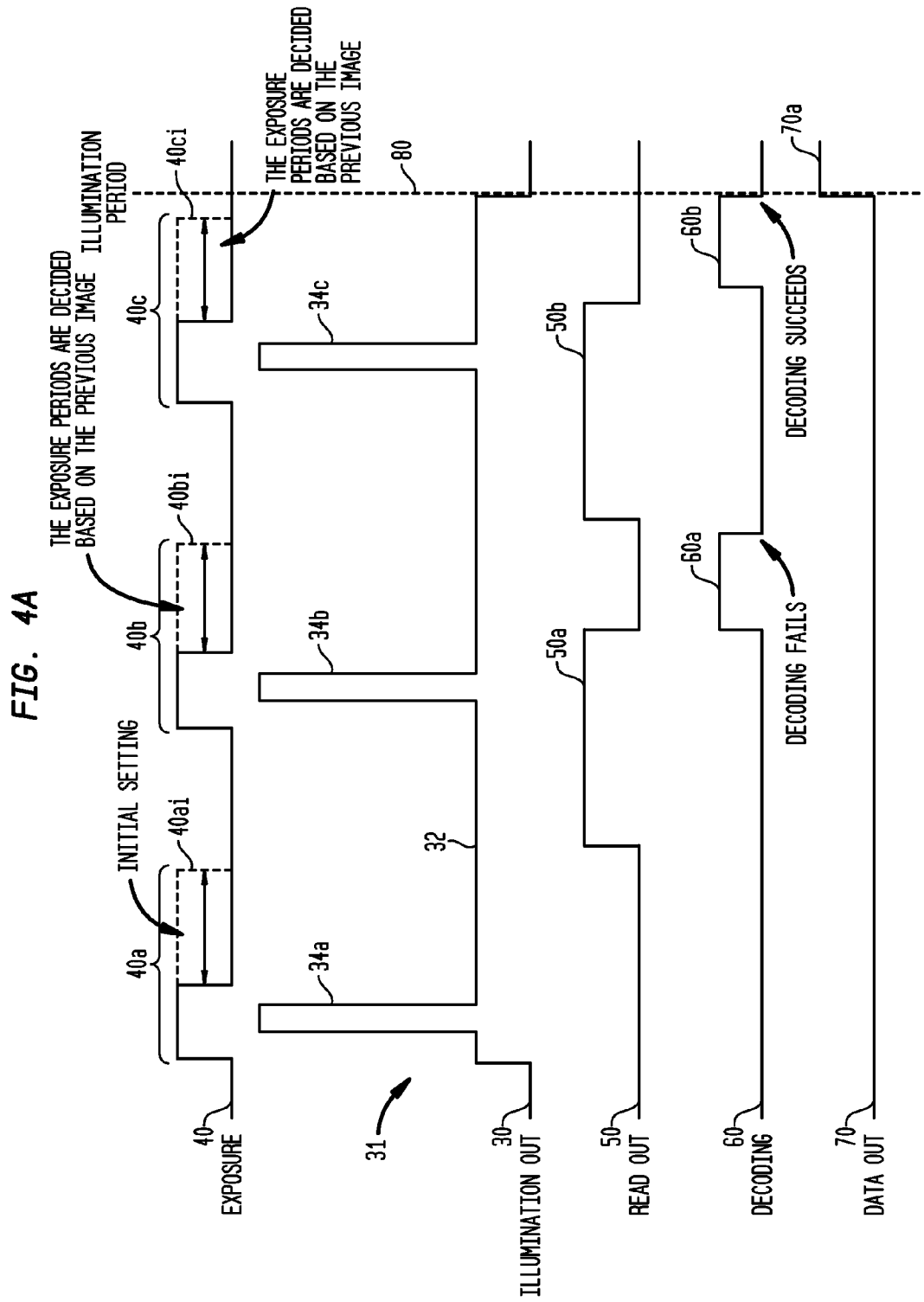

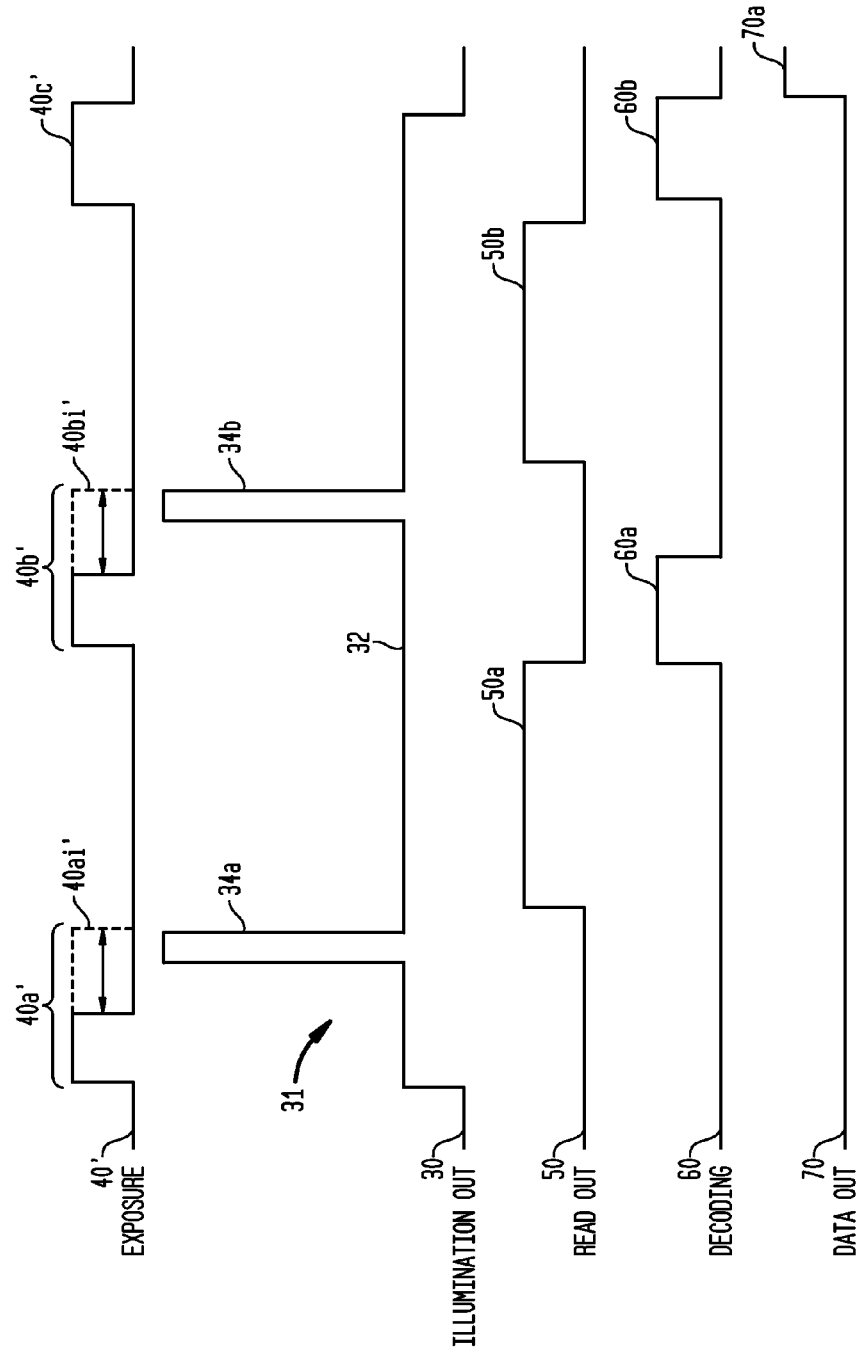

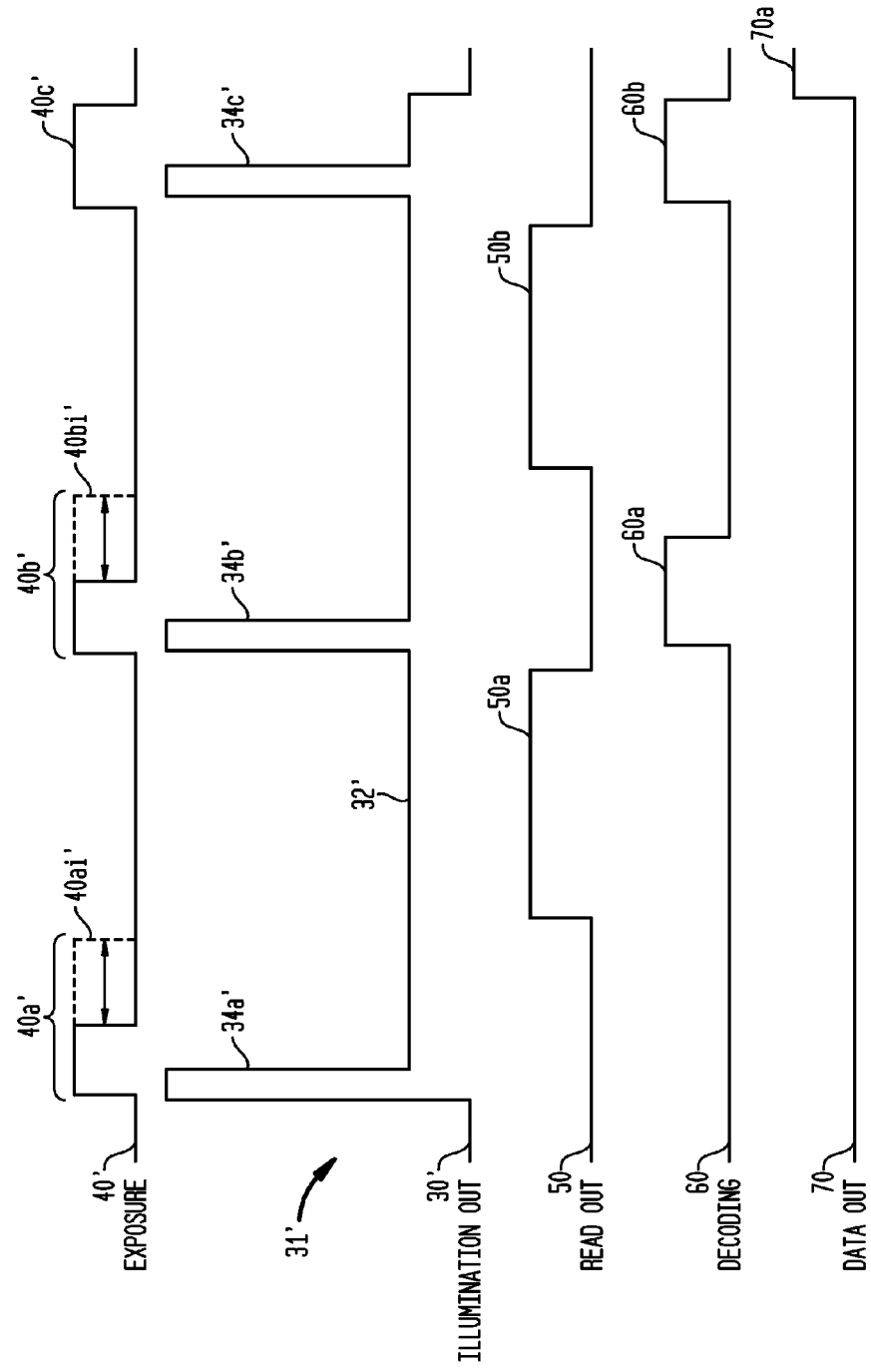

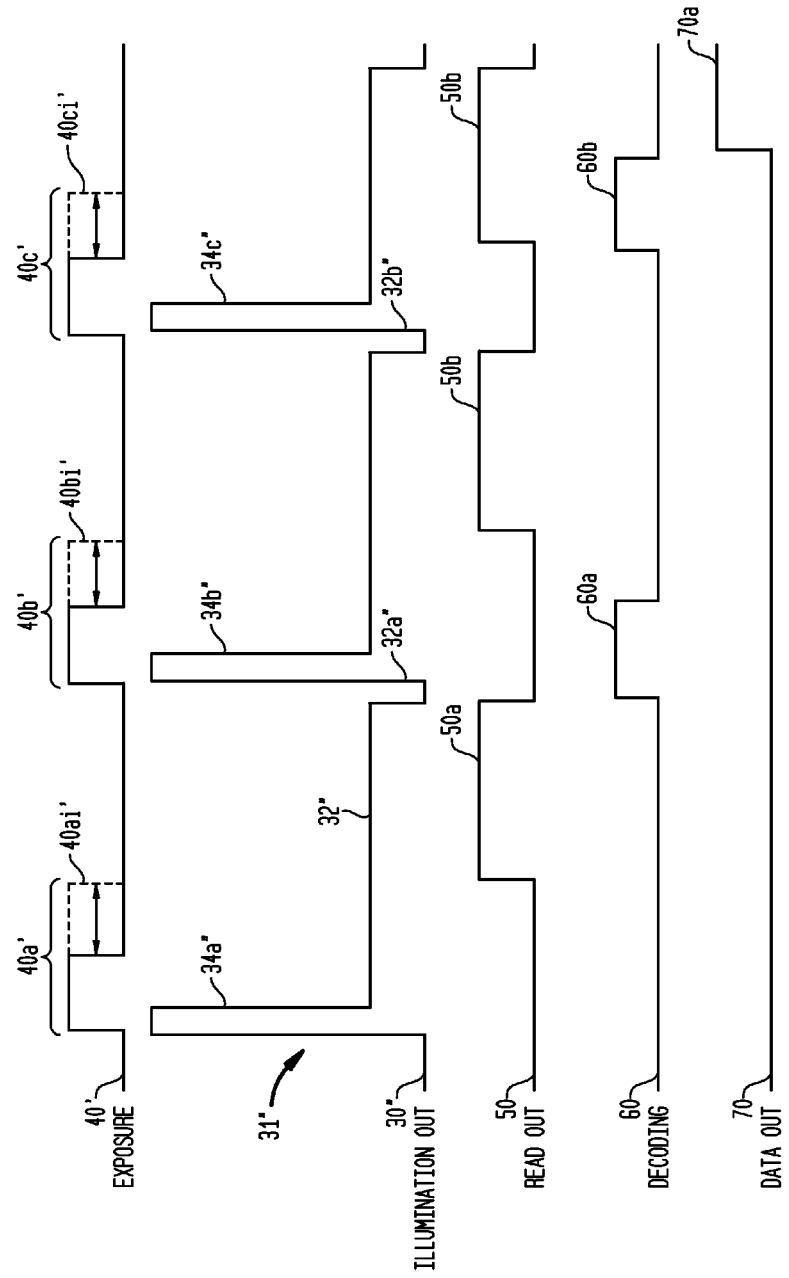

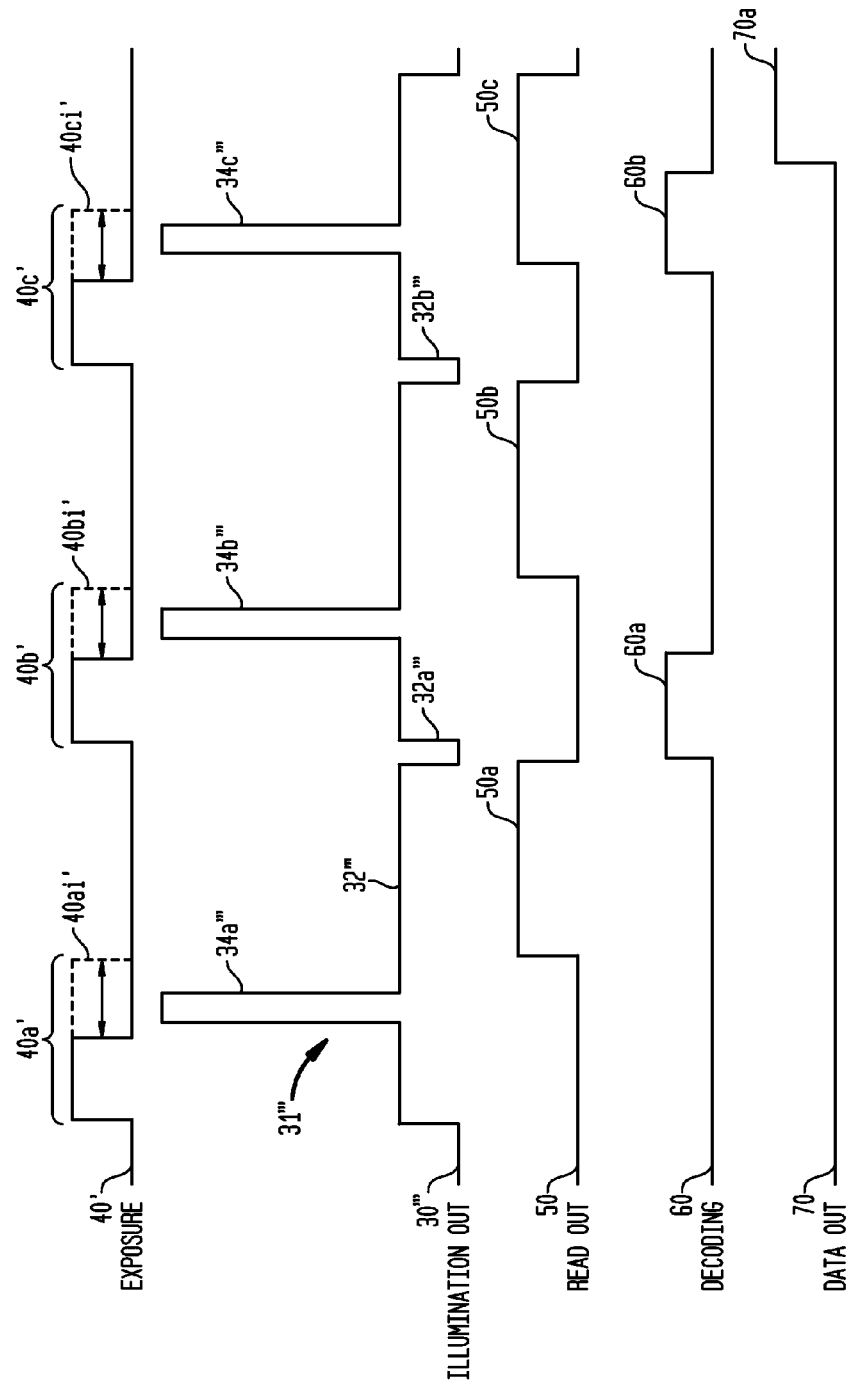

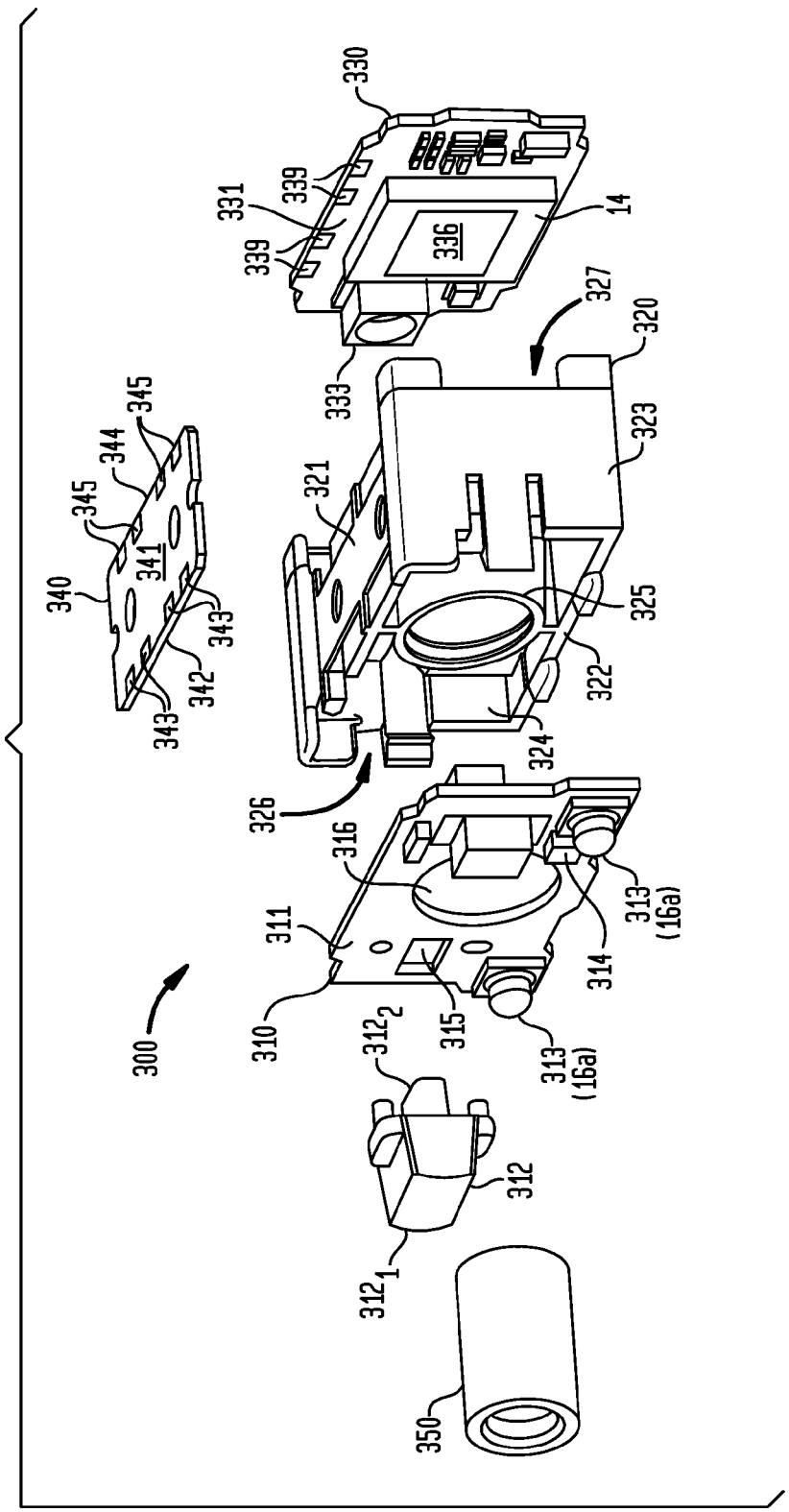

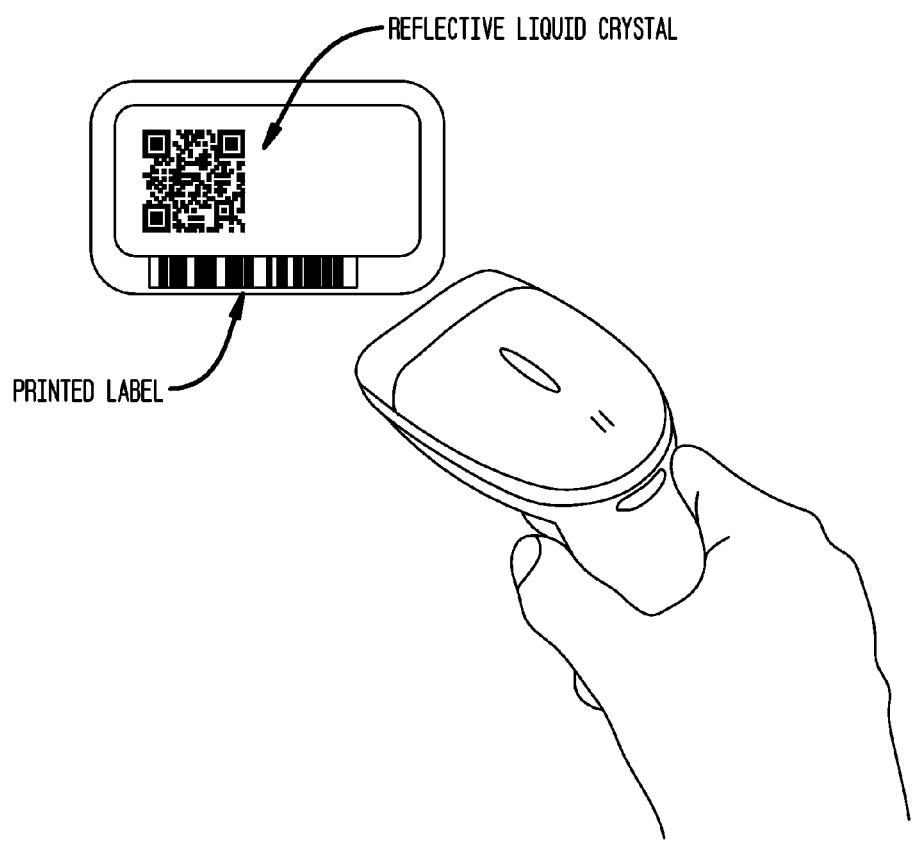

WHEN LONG ILLUMINATION IS APPLIED CONTINOUSLY, IT RESULTS IN A BLURRED IMAGE

BLUR IMAGE

NEED VERY SHORT ILLUMINATION

SHARP IMAGE

WHEN SHORT PULSED ILLUMINATION IS APPLIED, THE INDICIA IS STILL UNDER EXPOSED

A CONTINUOUS LONG EXPOSURE IS NEEDED FOR THE PROPER EXPOSURE.

IMAGE READING DEVICE CAPABLE OF PRODUCING ILLUMINATION INCLUDING A CONTINUOUS, LOW-INTENSITY LEVEL ILLUMINATION COMPONENT AND ONE OR MORE PULSED, HIGH-INTENSITY LEVEL ILLUMINATION COMPONENTS

FIELD

The disclosure relates to image reading devices (e.g., imagers). More particularly, the present disclosure relates to an imager capable of producing illumination comprising a continuous, low-intensity level illumination component and one or more pulsed, high-intensity level illumination components, for reading moving indicia, indicia in dark environments, indicia with low reflectivity and any combination thereof and related methods.

BACKGROUND

Optical image scanning and reading devices (image reading devices) read indicia, such as barcodes, that represent data about a product or service. A barcode is an optical machine-readable label attached to an object, which directly or indirectly represents information about the object or a service associated with the object. Such information can include, without limitation, vendor identification, product name, price, patient name and other descriptive information about the object. Barcode reading devices are widely used in distribution, retail and many other industries for reading barcodes.

Often, such devices are based upon charge coupled device (CCD) or CMOS technology, wherein a linear array CCD or CMOS device is used to recover light reflected from the barcode. In such systems, plural LEDs are typically used as a light source to illuminate an object such as a barcode. The reflected light is received by the CCD or CMOS linear array, which converts the light energy into electrical energy. The varying electrical signal can then be processed to recover an image of the object, which represents the information of interest.

Image readers are used for reading many different types of barcodes and other optically readable labels and indicia. For example, an image reader can be used for reading an electrical shelf labels as shown in FIG. 10A. The electrical shelf label includes a bar code label printed on paper and a reflective liquid crystal. The liquid crystal typically has a lower reflectivity than the printed label. Therefore, if the illumination period of the image reader is set relatively short with a low-intensity level of illumination to optimize the exposure of the printed label, the liquid crystal will be significantly under-exposed as shown in FIG. 10B. If, however, the illumination period of the image reader is extended to optimize the exposure of the liquid crystal, then the printed label will be significantly over-exposed as shown in FIG. 10C.

Image readers are also used for reading barcodes displayed on liquid crystal displays (FIG. 10D) and bar codes directly marked on surfaces of various types of objects and materials, such as a circuit board (FIG. 10E) or a metal surface (FIG. 10F). Similar to the liquid crystal applications, the illumination period of the image reader must be extended to optimize the exposure of such barcode images due to their low reflectivity.

In other applications, the barcode is moving when the image reader captures an image of it, as shown in FIG. 10G. If an extended illumination period (with low-intensity level of illumination) is continuously applied as the barcode moves across the field of view of the image reader, the image of the barcode will be blurred, as shown in FIG. 10H. Therefore, a very short illumination period with a high-intensity level of illumination is used to obtain a sharp image of the moving barcode, as shown in FIG. 10I.

In still other applications, the image reader may capture an image of a barcode in an environment with very low ambient lighting, such as a dark warehouse and or if the bar code is at a far distance from the image reader. As shown in the graph of FIG. 10J, the illumination intensity decreases with increasing depth of field or distance from the image reader. If a very short, pulsed illumination period (with a high-intensity level of illumination) is applied to read the barcode, the image of the barcode will be under-exposed, as shown in FIG. 10K. Therefore, an extended illumination period with a low-intensity level of illumination is used to obtain an optimally exposed image of the barcode, as shown in FIG. 10L. The low-intensity level of illumination is used because the illumination sources (e.g., LEDs) generate an excessive amount of heat when driven by a large current to generate the high-intensity level of illumination. Therefore, if the illumination sources are driven for an extended illumination period to produce a high-intensity level of illumination, the life time and reliability of the illumination sources can be negatively affected.

Accordingly, an image reader is needed which is capable of capturing images of moving indicia, indicia in dark environments, indicia with low reflectivity and any combination thereof, with optimal exposure and without negatively affecting the life time and reliability of the illumination sources of the image reader.

SUMMARY

Disclosed herein is an image reading device comprising an illumination system and a processor for controlling the illumination system. The processor is operative for causing the illumination system to produce illumination according to an illumination period comprising a continuous or substantially continuous, illumination sub-period and at least one pulsed, illumination sub-period. The continuous or substantially continuous, illumination sub-period causes the illumination system to produce a continuous or substantially continuous, illumination component and the at least one pulsed, illumination sub-period producing at least one pulsed, illumination component.

Further disclosed herein is a method for controlling an illumination system of an image reading device. The method comprises the steps of executing an illumination period with a processor, the illumination period comprising a continuous or substantially continuous, illumination sub-period and at least one pulsed, illumination sub-period. Responsive to the continuous or substantially continuous, illumination sub-period executed by the processor, the illumination system is activated to produce a continuous or substantially continuous, illumination component. Responsive to the at least one pulsed, illumination sub-period executed by the processor, the illumination system is activated to produce at least one pulsed, illumination component.

Also disclosed herein is a method for decoding an image captured by an image reader. In one embodiment, the method comprises the steps of a) collecting light with a sensor of the image reader, the light reflected from an illuminated target over an exposure period, b) analyzing an image representing the light collected by the sensor, c) decoding the image if the image is optimally exposed, d) extending the exposure period of the image reader if the image is not optimally exposed and repeating step b until the image is optimally exposed, and e) decoding the image if the image is optimally exposed in repeated step b.

In other embodiments, the method for decoding an image captured by an image reader comprises the steps of a) dividing an imaging area of the image sensor into a plurality of blocks, b) setting a different gain value for each of the blocks, c) collecting light with a sensor of the image reader, the light reflected from an illuminated target over an exposure period, d) selecting one of the gain values of one of the blocks, e) decoding an image representing the light collected by the sensor using the selected gain value, and f) repeating steps d and e until the image is successfully decoded.

BRIEF DESCRIPTION OF THE DRAWINGS

FIGS. 4A-4F are timing diagrams illustrating various exemplary embodiments of the illumination period of the disclosure.

FIGS. 10A-10L illustrate image reader applications and prior art illumination periods.

DETAILED DESCRIPTION

Figure 1:
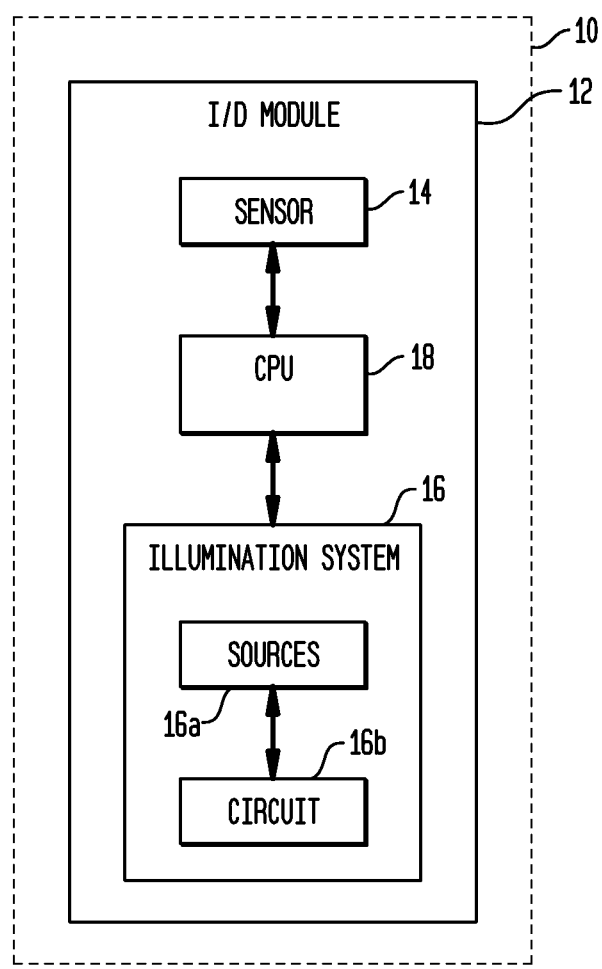
FIG. 1 is a block diagram of an image reader according to an exemplary embodiment of the disclosure.

FIG. 1 is an exemplary embodiment of an image reader 10 for capturing a sharply focused and properly exposed image of: 1) moving indicia, 2) indicia in low ambient light environments, 3) indicia with low reflectivity and 4) any combination thereof. The image reader 10 includes an imaging and decoding (I/D) module 12 that can contain an image sensor 14, an illumination system 16, and a central processing unit (CPU) 18 for controlling the image sensor 14 and the illumination system 16. The illumination system 16 can include one or more illumination sources 16a and an illumination circuit 16b for activating the illumination sources in response to one or more control signals received from the CPU 18. The illumination sources 16a are capable of generating light, which illuminates targeted indicia, such as a bar code, or some other object. The illuminated indicia reflects the light generated by the illumination sources 16a. The reflected light can be collected by the image sensor 14. The CPU 18 can control the illumination period and the exposure period of the image reader 10. The illumination period defines the time during which the targeted indicia is illuminated by the illumination system 16 and the intensity of the illumination. The exposure period is the time during which the pixels of the image sensor 14 are activated to photo-convert incident light into charge.

Figure 2A:
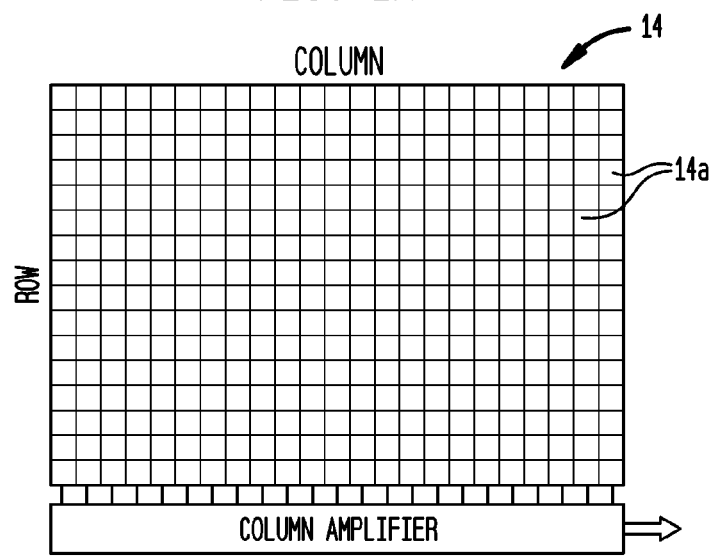
FIG. 2A is a diagram of an image sensor according to an exemplary embodiment of the disclosure.
Figure 2B:
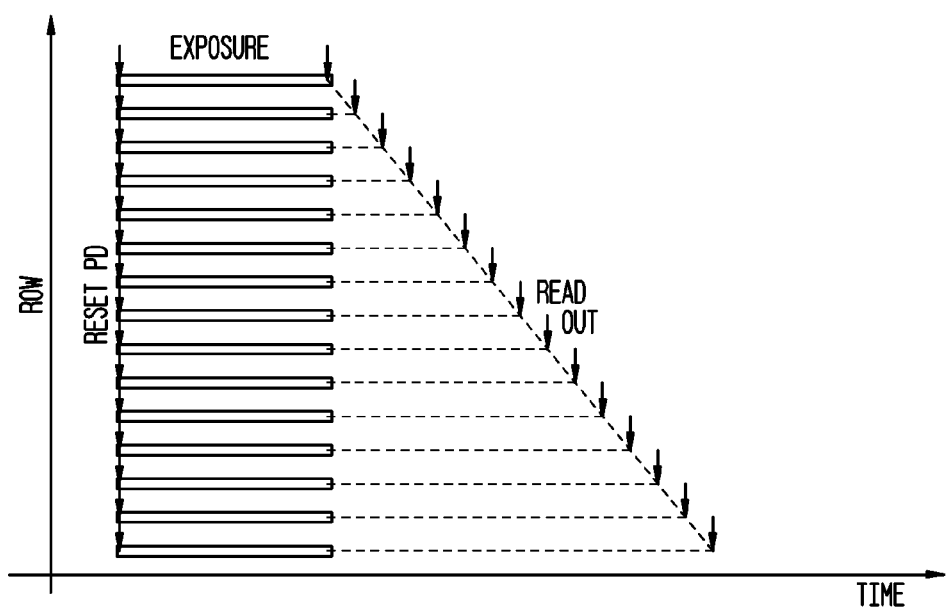
FIG. 2B is a graph illustrating global shutter operation of an image sensor.

As shown in FIG. 2A, the image sensor 14 may comprise a two-dimensional array of pixels 14a. As depicted in the graph of FIG. 2B, the CPU 18, in one embodiment, can generate a control signal that causes the image sensor 14 to operate in a global shutter mode wherein all the rows of pixels are contemporaneously exposed to light reflected from the illuminated indicia. The contemporaneous exposure of all the pixels 14a of the image sensor 14 allows the image reader to capture a sharply focused image of the targeted indicia without image distortion. At the end of the exposure period, the collected charge can be read out by the CPU 18.

Figure 3A:
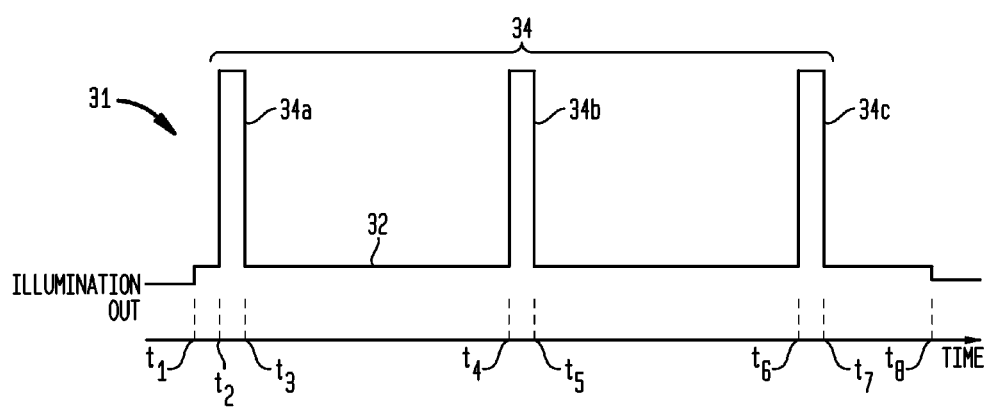
FIG. 3A is an illumination out timing diagram showing an illumination period according to an exemplary embodiment of the disclosure.

FIG. 3A depicts an exemplary embodiment of an illumination out timing diagram showing an illumination period 31 according to the disclosure. The illumination period 31 comprises a continuous, low-intensity level (LIL) illumination sub-period 32 and one or more pulsed, high-intensity level (HIL) illumination sub-periods 34 (e.g., first, second, and third pulsed, HIL illumination sub-periods 34a, 34b, and 34c, respectively). When the CPU 18 executes the illumination period 31, the continuous, LIL illumination sub-period 32 causes the illumination system 16 to produce a continuous, low-intensity level of illumination and each pulsed, HIL illumination sub-period 34 causes the illumination system to produce a pulse of a high-intensity level of illumination, in addition to the continuous, low-intensity level of illumination. Therefore, during each pulsed, HIL illumination sub-period 34, the illumination system 16 simultaneously produces low-intensity and high-intensity levels of illumination. The continuous, LIL illumination sub-period 32 (and the corresponding low-intensity level of illumination produced by the illumination system in response to sub-period 32) can start at a time $t_i$ when the image reader is triggered and ends, for example but not limitation, at a time $t_8$ when a successful decoding of a captured image takes place. The one or more pulsed, HIL illumination sub-periods 34a, 34b, 34c (and the corresponding high-intensity level of illumination pulses produced by the illumination system in response to sub-periods 34a, 34b, 34c) each extends for a very short period of time (e.g., $t_2$-$t_3$ for sub-period 34a, $t_4$-$t_5$ for sub-period 34b and $t_6$-$t_7$ for sub-period 34c) relative to continuous, LIL illumination sub-period 32 (and the corresponding continuous low-intensity level of illumination).

Operating the illumination system 16 according to the illumination period of the disclosure allows the image reader 10 to capture images of indicia in low ambient light environments, images of indicia with low reflectivity, images of moving indicia, and any combination thereof, which are sharply focused and have a correct or optimum exposure. In addition, the illumination period allows the circuit scale of the image reader 10 to be decreased and permits the image reader 10 to read different indicia in the same field of view.

Figure 3B:
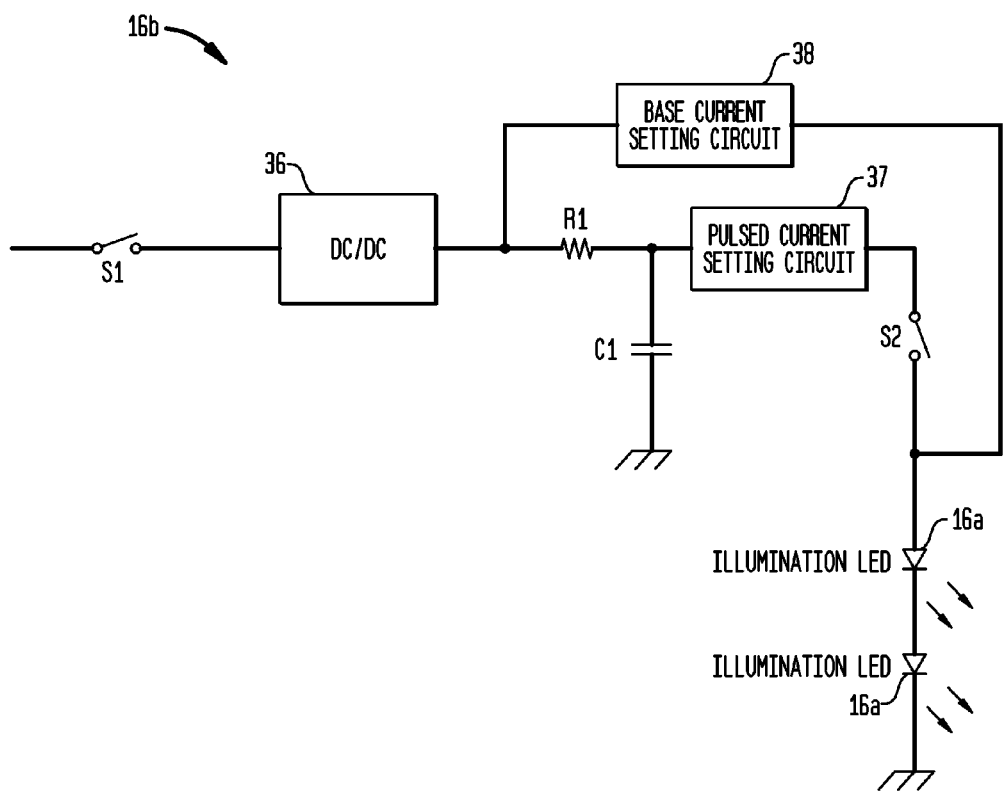
FIG. 3B is a schematic representation of an illumination circuit according to an exemplary embodiment of the disclosure.

FIG. 3B depicts an exemplary embodiment of the illumination circuit 16b of the illumination system 16. The circuit 16b may comprise a low-voltage circuit that can include a first switch S1 having a first terminal coupled to a DC power source (not shown) and a second terminal coupled to an input of a DC/DC step-down transformer 36. An output of the transformer 36 can be coupled to a first terminal of a resistor R1. A second terminal of the resistor R1 can be coupled to an input of a pulsed current setting circuit 37. An output of the pulsed current setting circuit 37 can be coupled to a first terminal of a second switch S2. A second terminal of the second switch S2 can be coupled to the illumination sources 16a (e.g., LEDs) of the illumination system 16. A base current setting circuit 38 can be coupled between the first terminal of the resistor R1 and the second terminal of the second switch S2. The structure and operation of each of the DC/DC step-down transformer 36, the pulsed current setting circuit 37, and the base current setting circuit 38 are well known in the art, therefore, no further discussion of these components is provided herein.

Referring again to FIGS. 3A and 3B, Prior to the running of the illumination period 31, the first switch S1 and the second switch S2 can be both turned off. The CPU 18 may generate a first control signal at the beginning of the continuous, LIL illumination sub-period 32 of the illumination period 31 that turns on the first switch S1 when triggered at time $t_1$ thereby causing the base current setting circuit 38 to generate a base DC current which drives the illumination sources 16a in manner that causes them to emit illumination at a low-intensity level. The CPU 18 may generate a second control signal at the beginning of the pulsed illumination sub-period 34a of the illumination period 31 that turns on the second switch S2 at time $t_2$ thereby causing the pulsed current setting circuit 37 to generate an elevated DC current which overdrives the DC-base-current driven illumination sources 16a and causes them to emit illumination at a high-intensity level. The CPU 18 may generate a third control signal at the end of the pulsed illumination sub-period 34a that turns off the second switch S2 at time $t_3$ thereby causing the pulsed current setting circuit 37 to stop generating the elevated DC current, which in turn causes the illumination sources 16a to stop emitting the illumination at the high intensity level while continuing to emit illumination at the low-intensity level via the DC base current. If an image captured by the image reader 10 does not decode successfully, the CPU 18 may generate a fourth control signal at the beginning of pulsed illumination sub-period 34b of the illumination period 31 that switches on the second switch S2 at time $t_4$ thereby causing the pulsed current setting circuit 37 to generate the elevated DC current which overdrives the DC-base-current driven illumination sources 16a and causes them to emit the high intensity level illumination again. The CPU 18 may generate a fifth control signal at the end of the pulsed illumination sub-period 34b that switches off the second switch S2 at time $t_5$ thereby causing the pulsed current setting circuit 37 to stop generating the elevated DC current, which in turn causes the illumination sources 16a to stop emitting the illumination at the high intensity level while continuing to emit illumination at the low intensity level via the DC base current. If an image captured by the image reader 10 does not decode successfully, the CPU 18 may generate a sixth control signal at the beginning of pulsed illumination sub-period 34c of the illumination period 31 that switches on the second switch S2 at time $t_6$ thereby causing the pulsed current setting circuit 37 to generate an elevated DC current which overdrives the DC-base-current driven illumination sources 16a and causes them to emit the high intensity level illumination again. The CPU 18 may generate a seventh control signal at the end of the pulsed illumination sub-period 34c that switches off the second switch S2 at time $t_7$ thereby causing the pulsed current setting circuit 37 to stop generating the elevated DC current, which in turn may cause the illumination sources 16a to stop emitting the illumination at the high intensity level while continuing to emit illumination at the low intensity level via the DC base current. Upon a successful decoding of an image captured by the image reader 10, the output of sensor 14 data (data_out), or a reading time out (read_out), the CPU 18 may generate an eighth control signal at the end of the continuous, illumination sub-period 32 of the illumination period 31 that turns off the first switch S1 at time $t_8$ thereby causing the base current setting circuit 38 to stop generating the DC base current driving the illumination sources 16a, which in turn, causes them to stop emitting the low intensity level illumination. As should be from FIGS. 3A and 3B, the continuous, illumination sub-period 32 may extend from the turning on of switch S1 (e.g., $t_1$) to the turning off of switch S1 (e.g., $t_8$). The length of time between each turning on of switch S2 and each corresponding turning off of switch S2 may be selected to be a period of time that prevents heat damage to the illumination sources 16a. In one non-limiting exemplary embodiment, this length of time (between each switch S2 on and switch S2 off) can be 500 μs (microseconds) or less. Further, switch S2 can be turned on and turned off at least one time during the illumination period 31.

FIG. 4A illustrates a timing diagram implemented by the CPU 18 of the image reader according to an embodiment of the disclosure. The CPU 18 may generate various control signals and performs various operations when it executes illumination-out timing 30, exposure timing 40, read-out timing 50, decoding timing 60 and data-out timing 70. The CPU 18 may cause the image sensor 14 to operate in the global shutter mode to collect light during each exposure period 40a, 40b, and 40c of exposure timing 40. The CPU 18 may read light data collected by the image sensor 14 during read-out periods 50a and 50b of read-out timing 50, which in FIG. 4A, overlap the exposure periods (e.g., read-out period 50a overlaps exposure periods 40b and read-out period 50b overlaps exposure period 40c) of the exposure timing 40. In the embodiment of FIG. 4, the CPU 18 makes two attempts to decode the light data to generate an image captured by the image reader 10 during decoding periods 60a and 60b of the decoding timing 60. The first decoding attempt corresponding to decoding period 60a is unsuccessful, however, the second decoding attempt corresponding to decoding period 60b is successful. In other embodiments, the CPU 18 may make more or less than two attempts to decode the light data. Upon the completion of successful image decoding (e.g., at the end of decoding sub-period 60b), the continuous LIL illumination sub-period 32 of illumination period 30 may terminate (represented by dashed line 80). A successful decoding of the image captured by the image reader 10 may take several exposure/read-out periods. Upon the successful decoding of the image and the termination of the illumination period 30, the data-out period 70a of the data out timing may commence.

Figure 4B:
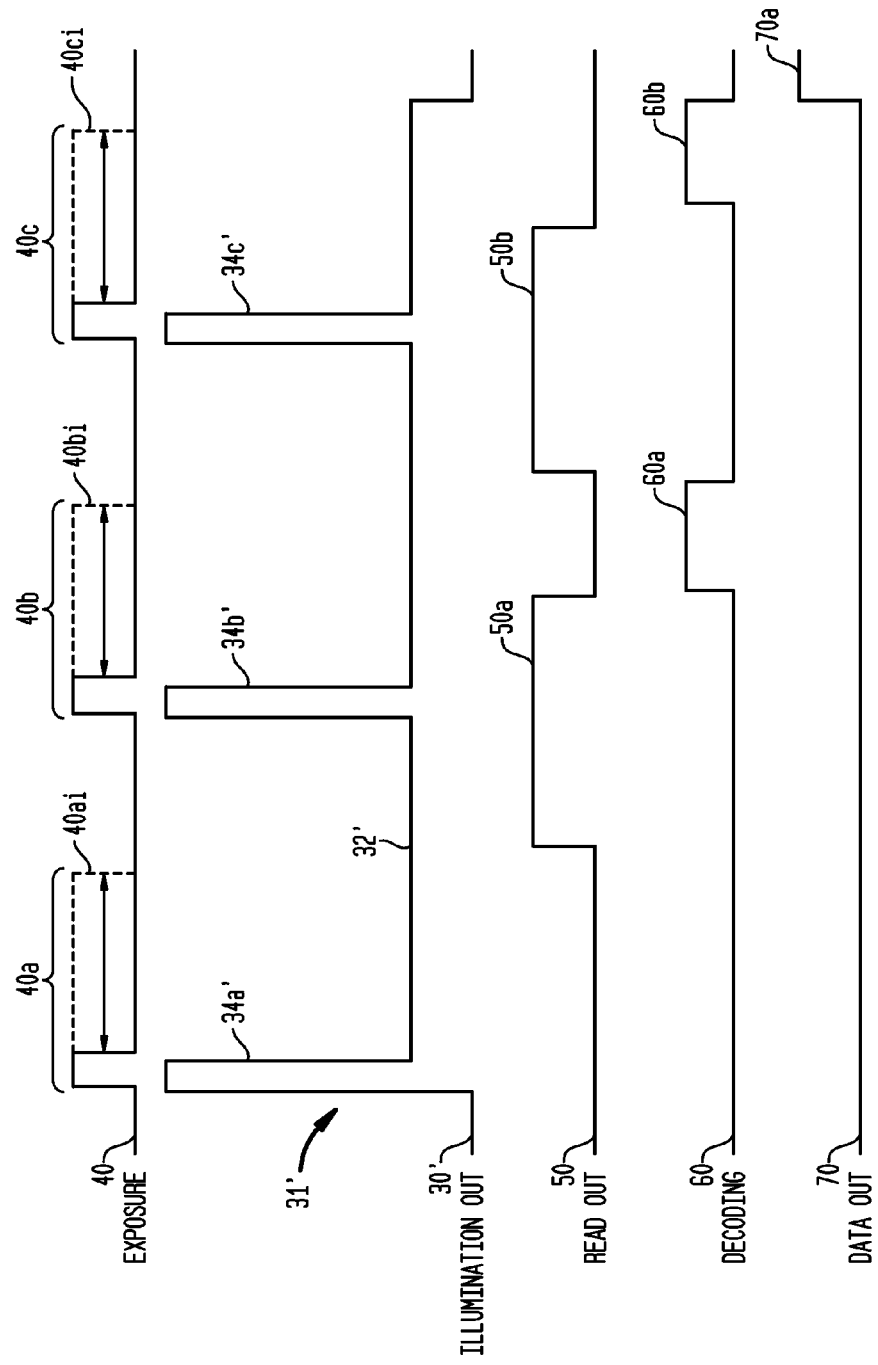

FIG. 4B illustrates a timing diagram implemented by the CPU 18 of the image reader according to another embodiment of the disclosure. The timing diagram of FIG. 4B is similar to the timing diagram of FIG. 4A, except the illumination period 31' of illumination out timing 30' may comprise a continuous illumination sub-period 32' and a first pulsed illumination sub-period 34a' which start simultaneously.

FIG. 4C illustrates a timing diagram implemented by the CPU 18 of the image reader according to a further embodiment of the disclosure. The timing diagram of FIG. 4C is similar to the timing diagram of FIG. 4A, except the exposure timing 40' may comprise shortened exposure periods 40a', 40b' which do not overlap read-out periods 50a, 50b.

FIG. 4D illustrates a timing diagram implemented by the CPU 18 of the image reader according to a further embodiment of the disclosure. The timing diagram of FIG. 4D is similar to the timing diagram of FIG. 4B, except the exposure timing 40' may comprise shortened exposure periods 40a', 40b' which do not overlap read-out periods 50a, 50b.

FIG. 4E illustrates a timing diagram implemented by the CPU 18 of the image reader according to a further embodiment of the disclosure. The timing diagram of FIG. 4E is similar to the timing diagram of FIG. 4D, except the illumination period 31" of illumination out timing 30" may comprise a continuous illumination sub-period 32" that ends briefly at 32a" and 32b" after read-out period 50a.

FIG. 4F illustrates a timing diagram implemented by the CPU 18 of the image reader according to a further embodiment of the disclosure. The timing diagram of FIG. 4F is similar to the timing diagram of FIG. 4C, except the illumination period 31''' of illumination timing 30''' may comprise a continuous illumination sub-period 32''' that ends briefly at 32a''' and 32b''' after read-out period 50a.

Figure 5A:
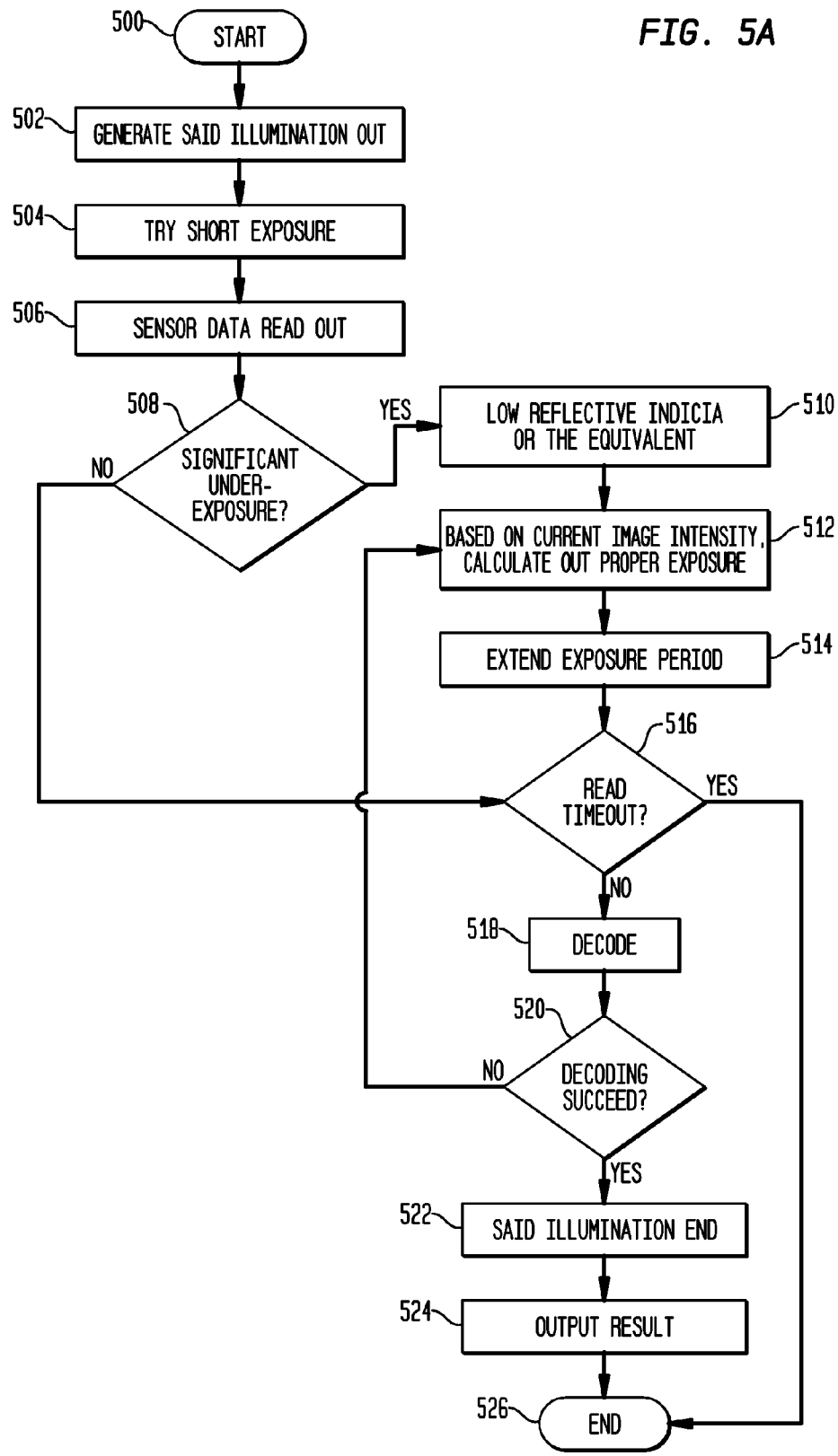
FIG. 5A is flowchart depicting an exemplary embodiment of a method for decoding an image captured by an image reader operating according to the timing diagrams of FIGS. 4A-4D.

FIG. 5A is flowchart depicting an exemplary embodiment of a method for decoding an image captured by the image reader 10 operating according to the timing diagrams of FIGS. 4A-4D. The method may allow the image reader 10 to determine the proper exposure period for imaged indicia or an imaged object in a single frame. The method commences at box 500 and advances to box 502 where the CPU 18 may cause the illumination system 16 to generate illumination according to the illumination period 31 (FIGS. 4A and 4C) or 31' (FIGS. 4B and 4D), which illuminates targeted indicia or an object with a continuous, low-intensity level illumination component and at least one pulsed, high-intensity level illumination component. In box 504, the CPU 18 may cause the image sensor 14 to collect light reflected from the illuminated indicia or object over a first selected exposure period $40a_i$ (FIGS. 4A and 4B) or $40a_i'$ (FIG. 4C and 4D), in the global shutter mode. The first exposure period is typically a relatively short image sensor shutter speed (e.g., can be less than 700 μs). In box 506, the CPU 18 may read image data representing the reflected light collected by the image sensor 14 (captured image) according to the read out period 50a (FIGS. 4A-4D). In box 508, the image data may be analyzed by the CPU 18. If the CPU 18 determines in box 508 that the captured image is not significantly under-exposed, the logic may flow to box 516 ("No"). The CPU 18, in box 516, may determine whether a read timeout has occurred (i.e., the termination of the illumination and imaging operations), and if so ("Yes"), the logic may flow to box 526 where the method ends. If, however, the CPU 18 determines in box 516 that a read timeout has not occurred, ("No"), the CPU 18 may attempt to decode the image in box 518 according to decoding period 60a (FIGS. 4A-4D). In box 520, the CPU 18 may determine whether the image was successfully decoded, and if so ("Yes"), the CPU 18 may terminate the illumination period 31 (FIGS. 4A and 4C) or illumination period 31' (FIGS. 4B and 4D) in box 522, and output the decoded image according to data out period 70a (FIGS. 4A-4D) in box 524. The logic may then flow to box 526 where the method ends. If, however, the decoding is not successful ("No"), the logic may flow to box 512. In box 512, the CPU 18 may calculate the proper exposure period based on the current image intensity of the captured image and in box 512, extend the exposure period (slow the shutter speed) according to $40b_i$ (FIGS. 4A and 4B) or $40b_i'$ (FIG. 4C and 4D). The method may then continue from box 516, as described above.

Returning to box 508, if the CPU 18 determines that the captured image is significantly under-exposed ("Yes"), the logic flows to box 510 where the CPU 18 may conclude that the indicia or object has low reflectivity or the equivalent and in box 512, calculates the proper exposure period based on the current image intensity of the captured image. Then in box 514, the CPU 18 may extend the exposure period (slow the shutter speed) according to $40b_i$ (FIGS. 4A and 4B) or $40b_i'$ (FIG. 4C and 4D). The method may then continue from box 516, as described above.

Figure 5B:
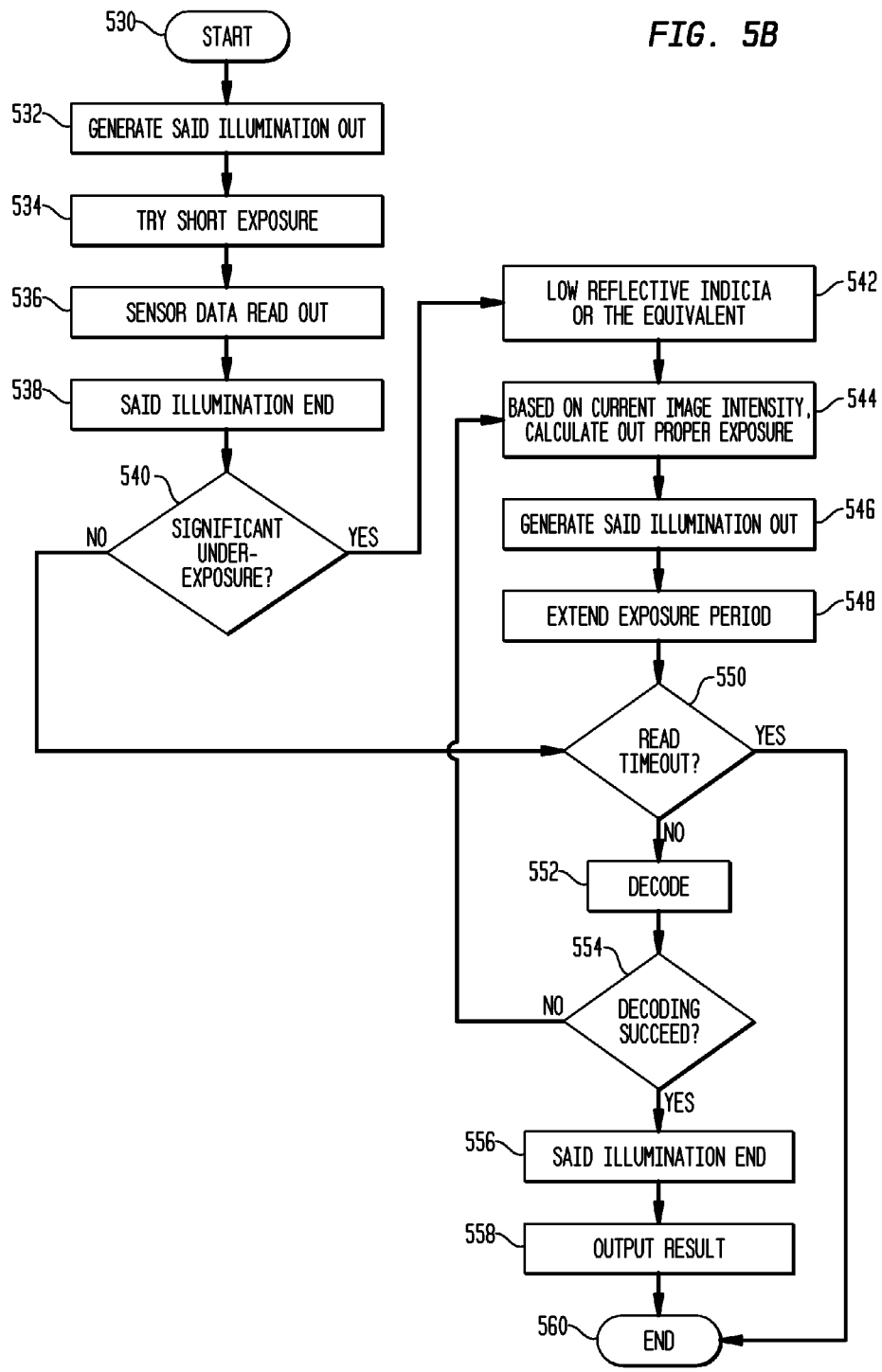
FIG. 5B is flowchart depicting another exemplary embodiment of a method for decoding an image captured by an image reader operating according to the timing diagrams of FIGS. 4E and 4F.

FIG. 5B is flowchart depicting an exemplary embodiment of a method for decoding an image captured by the image reader 10 operating according to the timing diagrams of FIGS. 4E and 4F. Similar to the method depicted in FIG. 5A, the method of FIG. 5B may allow the image reader 10 to determine the proper exposure period for imaged indicia or an imaged object in a single frame. The method commences at box 530 and advances to box 532 where the CPU 18 may cause the illumination system 16 to generate illumination according to the illumination period 31" (FIG. 4E) or 31''' (FIG. 4F), which illuminates targeted indicia or an object with a continuous, low-intensity level illumination component and at least one pulsed, high-intensity level illumination component. In box 534, the CPU 18 may cause the image sensor 14 to collect light reflected from the illuminated indicia or object over a first selected exposure period $40a_i'$ (FIGS. 4E and 4F), in the global shutter mode. The first exposure period is typically a relatively short image sensor shutter speed (e.g., can be less than 700 μs). In box 536, the CPU 18 may read image data representing the reflected light collected by the image sensor 14 (captured image) according to the read out period 50a (FIGS. 4E and 4F). In box 538, the illumination may be momentarily terminated according to timing portion 32a" of the illumination period 31" (FIG. 4E) or timing portion 32a''' of illumination period 31''' (FIG. 4F). In box 540, the image data may be analyzed by the CPU 18. If the CPU 18 determines in box 540 that the captured image is not significantly under-exposed, the logic may flow to box 550 ("No"). The CPU 18, in box 550, may determine whether a read timeout has occurred, and if so ("Yes"), may end the method in box 560. If the CPU 18 determines in box 550 that a read timeout has not occurred, ("No"), the CPU 18 may attempt to decode the image in box 552, according to decoding period 60a (FIGS. 4E and 4F). In box 554, the CPU 18 may determine whether the image was successfully decoded, and if so ("Yes"), the CPU 18 may terminate the illumination period 31" (FIG. 4E) or illumination period 31''' (FIG. 4F) in box 556, and output the decoded image according to data out period 70a (FIGS. 4E and 4F) in box 558. The logic may then flow to box 560 where the method ends. If, in box 554, the decoding is not successful ("No"), the logic may flow to box 544. In box 544, the CPU 18 may calculate the proper exposure period based on the current image intensity of the captured image, reactivate the illumination system according to the illumination period 31" (FIG. 4E) or illumination period 31'" (FIG. 4F) in box 546 and extend the exposure period (slow the shutter speed) according to $40b_i'$ (FIGS. 4E and 4F) in box 548. The method may then continue from box 550, as described above.

Figure 6A:
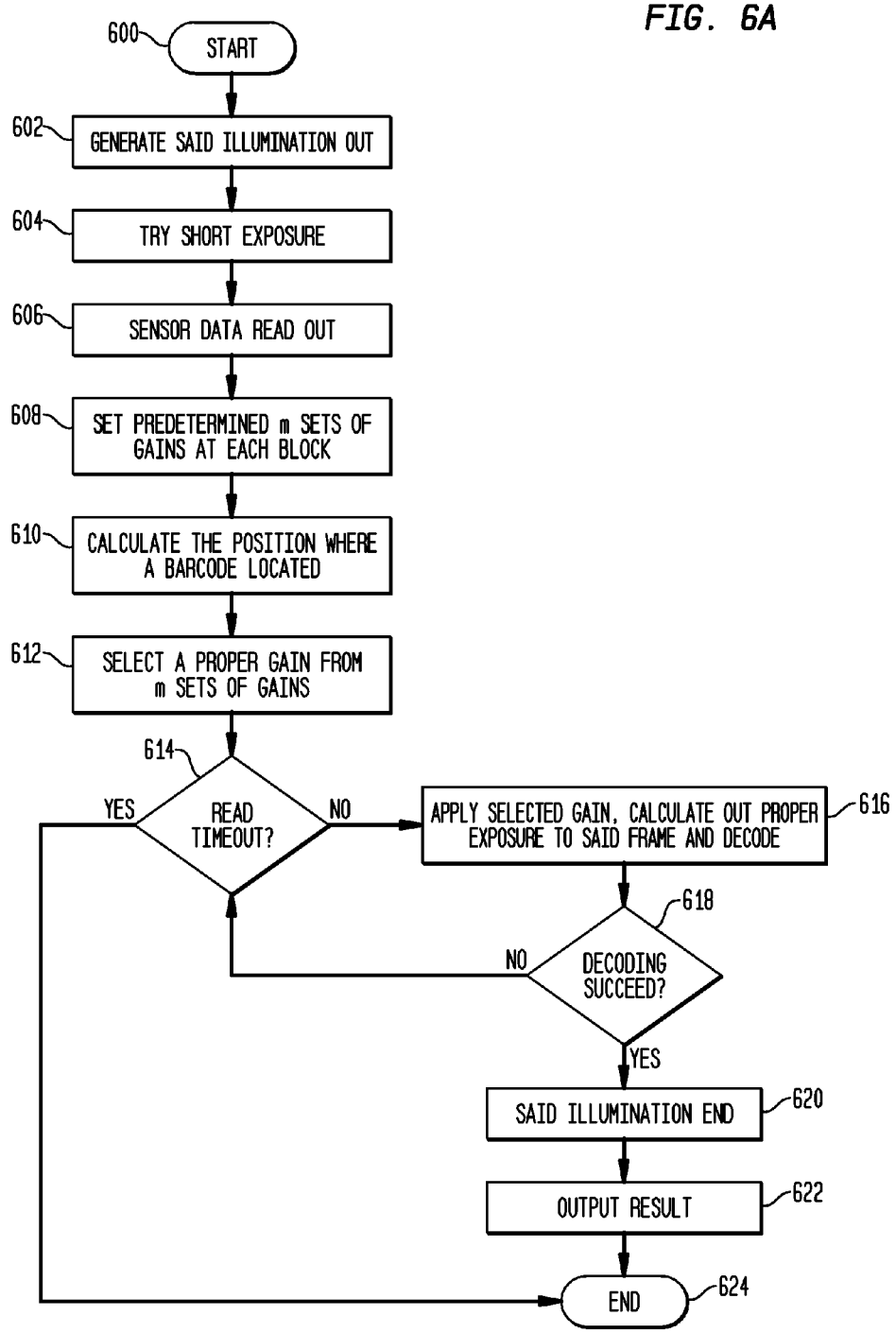
FIG. 6A is flowchart depicting still another exemplary embodiment of a method for decoding an image captured by an image reader operating according to the timing diagrams of FIGS. 4A-4D.

Returning to box 540, if the CPU 18 determines that the captured image is significantly under-exposed ("Yes"), the logic may flow to box 542 where the CPU 18 concludes that the indicia or object has low reflectivity or the equivalent, calculates the proper exposure period based on the current image intensity of the captured image in box 544, reactivates the illumination system according to the illumination period 31" (FIG. 4E) or illumination period 31'" (FIG. 4F) in box 546 and extends the exposure period (slow the shutter speed) according to $40b_i'$ (FIGS. 4E and 4F) in box 548. The method may then continue from box 550, as described above. FIG. 6A is flowchart depicting another exemplary embodiment of a method for decoding an image captured by the image reader 10 operating according to the timing diagrams of FIGS. 4A-4D. The method may allow the image reader 10 to determine the proper exposure period for imaged indicia or an imaged object in a single frame by sectioning the frame into individual exposure levels. The method commences at box 600 and advances to box 602 where the CPU 18 may cause the illumination system 16 to generate illumination according to the illumination period 31 (FIGS. 4A and 4C) or 31' (FIGS. 4B and 4D), which illuminates targeted indicia or an object with a continuous, low-intensity level illumination component and at least one pulsed, high-intensity level illumination component. In box 604, the CPU 18 may cause the image sensor 14 to collect light reflected from the illuminated indicia or object over a first selected exposure period $40a_i$ (FIGS. 4A and 4B) or $40a_i'$ (FIGS. 4C and 4D), in the global shutter mode. The first exposure period is typically a relatively short image sensor shutter speed (e.g., can be less than 700 µs). In box 606, the CPU 18 may read image data representing the reflected light collected by the image sensor 14 (captured image) according to the read out period 50a (FIGS. 4A-4D). In box 608, the CPU 18 may divide the imaging area IA (rows and columns) of the image sensor 14 into multiple blocks B as shown in FIG. 6C, and set a different gain value m for each block B, as shown in FIG. 6D. The CPU 18, in box 610, may determine the position where the indicia or object is located in the captured image (so that the exposure can be adjusted for decoding further on) and may select, in box 612, a proper one of the gain values from the plural sets of gain values, as shown in FIG. 6D. The CPU 18, in box 614, may determine whether a read timeout has occurred, and if so ("Yes"), the method may be ended in box 624. If, however, the CPU 18 determines in box 614 that a read timeout has not occurred, ("No"), the CPU 18, in box 616, may apply the selected gain value to the entire frame as shown in FIG. 6E, calculate the proper exposure for the frame, as per exposure period $40ai'$ (FIGS. 4E and 4F), and decode the captured image as per decoding period 60a (FIGS. 4E and 4F). In box 618, the CPU 18 may determine whether the image was successfully decoded, and if so ("Yes"), the CPU 18 may terminate the illumination period 31 (FIGS. 4A and 4C) or illumination period 31' (FIGS. 4B and 4D) in box 620, and output the decoded image according to data out period 70a (FIGS. 4A-4D) in box 622. The logic may then flow to box 624 where the method ends. If, however, the decoding is not successful ("No"), the logic may flow to box 614 and continue from there, as described above, such that the illumination level (brightness) of the illumination system 16 and the predefined image sensor's gain value are successively adjusted and selected, respectively, to determine the proper exposure level, which is then used by the CPU 18 for decoding the image. This allows the selected exposure level to be reproduced and reflected in the next image captured by the image reader for decoding.

Figure 6B:
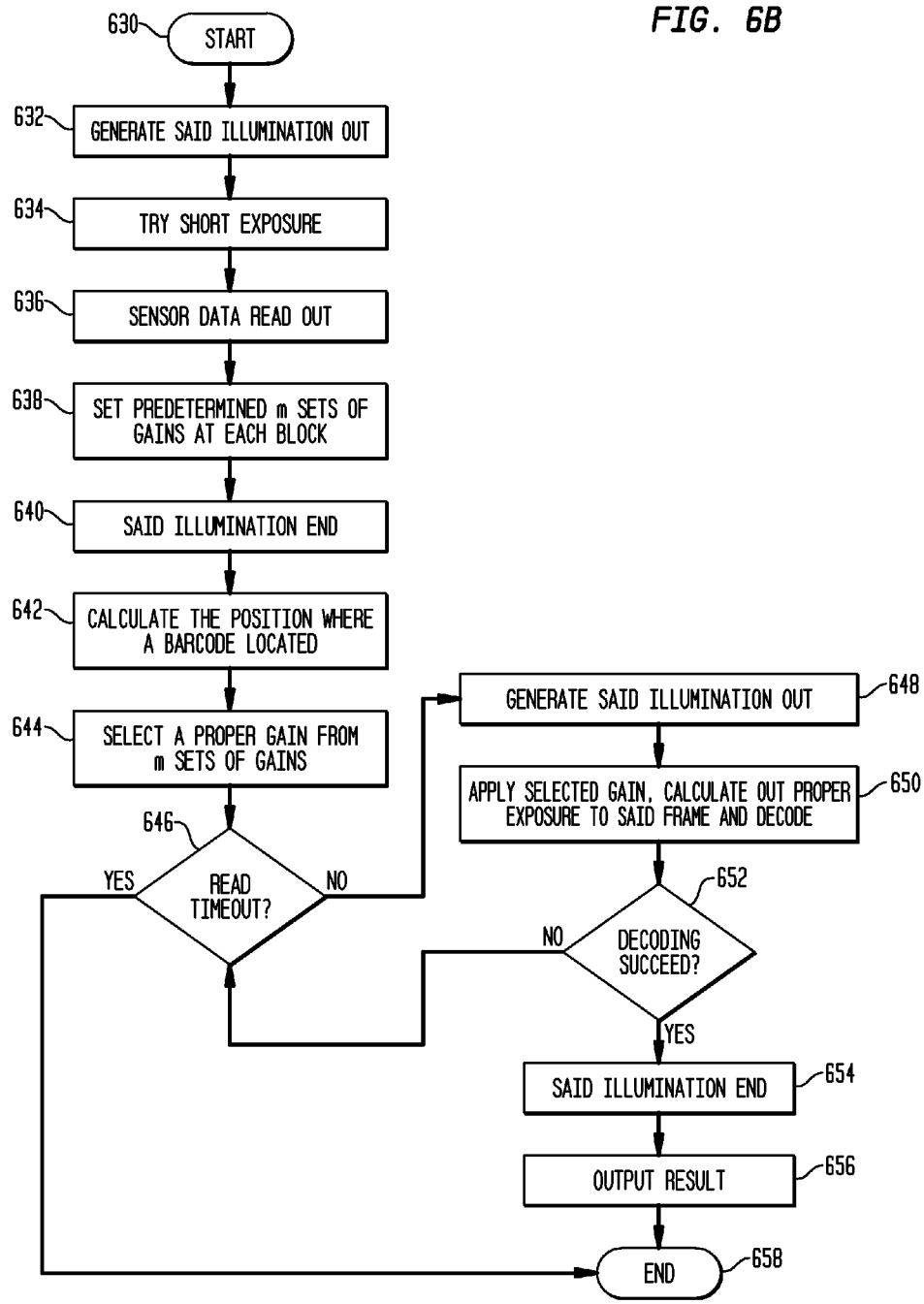
FIG. 6B is flowchart depicting still an exemplary embodiment of a method for decoding an image captured by an image reader operating according to the timing diagrams of FIGS. 4E and 4F.
Figure 6C:
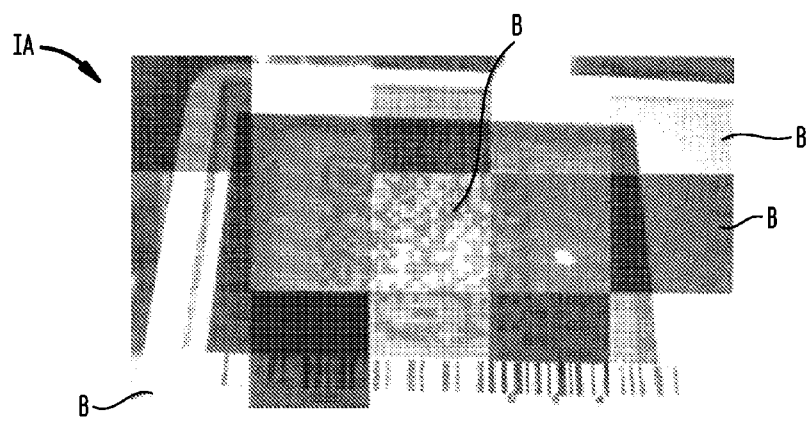
FIG. 6C is a diagram illustrating the imaging area of an image sensor divided into multiple blocks according to an exemplary embodiment of the disclosure.
Figure 6D:
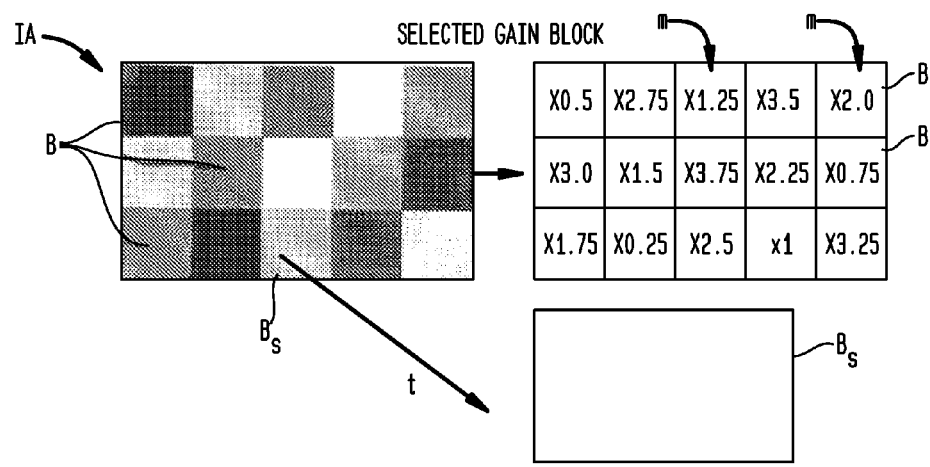
FIG. 6D is a diagram illustrating different gain values set for the blocks of the image sensor imaging area according to an exemplary embodiment of the disclosure.
Figure 6E:
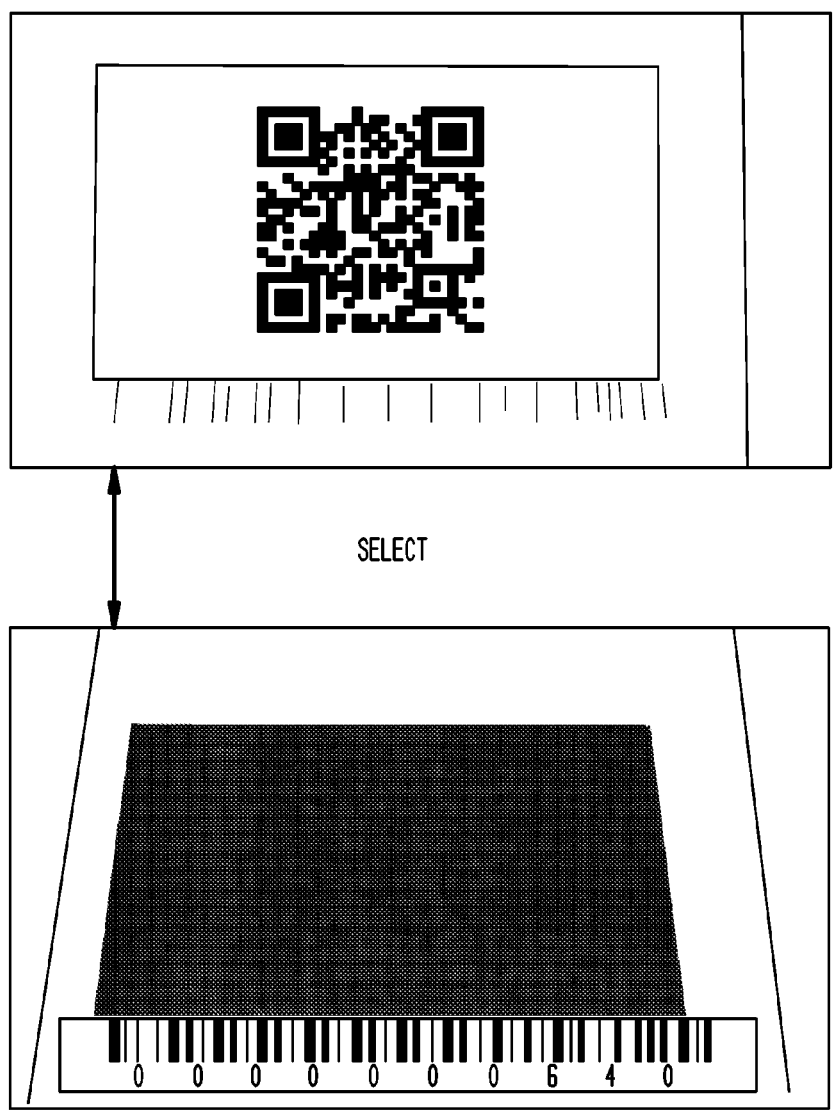
FIG. 6E is a diagram illustrating the determination of the position where indicia of an object is located in a captured image and the selection of a proper one of the gain values from the plural sets of gain values.

FIG. 6B is flowchart depicting another exemplary embodiment of a method for decoding an image captured by the image reader 10 operating according to the timing diagrams of FIGS. 4E and 4F. The method may allow the image reader 10 to determine the proper exposure period for imaged indicia or an imaged object in a single frame by sectioning the frame into individual exposure levels. The method commences at box 630 and advances to box 632 where the CPU 18 may cause the illumination system 16 to generate illumination according to the illumination period 31" (FIG. 4E) or 31'" (FIG. 4F), which illuminates targeted indicia or an object with a continuous, low-intensity level illumination component and at least one pulsed, high-intensity level illumination component. In box 634, the CPU 18 may cause the image sensor 14 to collect light reflected from the illuminated indicia or object over a first selected exposure period $40a_i'$ (FIGS. 4E and 4F), in the global shutter mode. The first exposure period is typically a relatively short image sensor shutter speed (e.g., can be less than 700 µs). In box 636, the CPU 18 may read image data representing the reflected light collected by the image sensor 14 (captured image) according to the read out period 50a (FIGS. 4E and 4F). In box 638, the CPU 18 may divide the imaging area IA (rows and columns) of the image sensor 14 into multiple blocks B as shown in FIG. 6C, and set a different gain value m for each block B, as shown in FIG. 6D. In box 640, the illumination may be momentarily terminated according to timing portion 32a" of the illumination period 31" (FIG. 4E) or timing portion 32a'" (FIG. 4F). The CPU 18 in box 642 may determine the position where the indicia or object is located in the captured image (so that the exposure can be adjusted for decoding further on) and select in box 644 a proper one of the gain values from the plural sets of gain values, as shown in FIG. 6D. The CPU 18, in box 646, may determine whether a read timeout has occurred, and if so ("Yes"), the method may be ended in box 658. If, however, the CPU 18 determines in box 646 that a read timeout has not occurred, ("No"), the CPU 18 in box 648, may reactivate the illumination system according to the illumination period 31" (FIG. 4E) or illumination period 31'" (FIG. 4F). In box 650, the CPU 18 may apply the selected gain value to the entire frame as shown in FIG. 6E, calculate the proper exposure for the frame, as per exposure period $40ai'$ (FIGS. 4E and 4F), and decode the captured image as per decoding period 60a (FIGS. 4E and 4F). In box 652, the CPU 18 may determine whether the image was successfully decoded, and if so ("Yes"), the CPU 18 may terminate the illumination period 31" (FIG. 4E) or illumination period 31'" (FIG. 4F) in box 654, and output the decoded image according to data out period 70a (FIGS. 4E and 4F) in box 656. The logic may then flow to box 658 where the method may be ended. If, however, the decoding is not successful ("No"), the logic may flow to box 646 and continue from there, as described previously.

Figure 7:
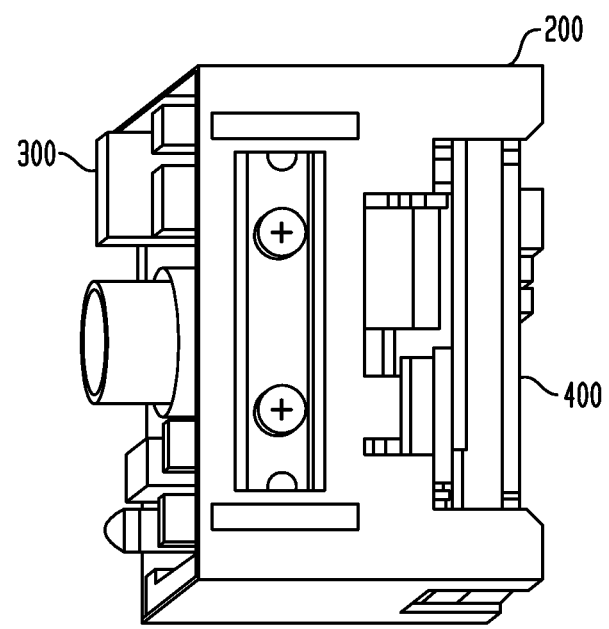
FIG. 7 is a top perspective view of an imaging and decoding (I/D) module according an exemplary embodiment of the disclosure.

FIG. 7 is a top perspective view of the imaging and decoding (I/D) module 12, according an exemplary embodiment of the disclosure. The I/D module comprises a chassis module 200, a camera module 300 and a decoder module 400.

FIG. 8A is an exploded view of the camera module 300, according to an exemplary embodiment. The camera module 300 comprises an illumination system printed circuit board (PCB) 310, a camera body 320, an image sensor PCB 330, and an interconnect PCB 340. The illumination system PCB 310 is mounted on a front side 326 of the camera body 320, the interconnect PCB 340 is mounted on a top wall 321 of the camera body 320, and the image sensor PCB 330 is mounted on a rear side 327 of the camera body 320.

Figure 8B:
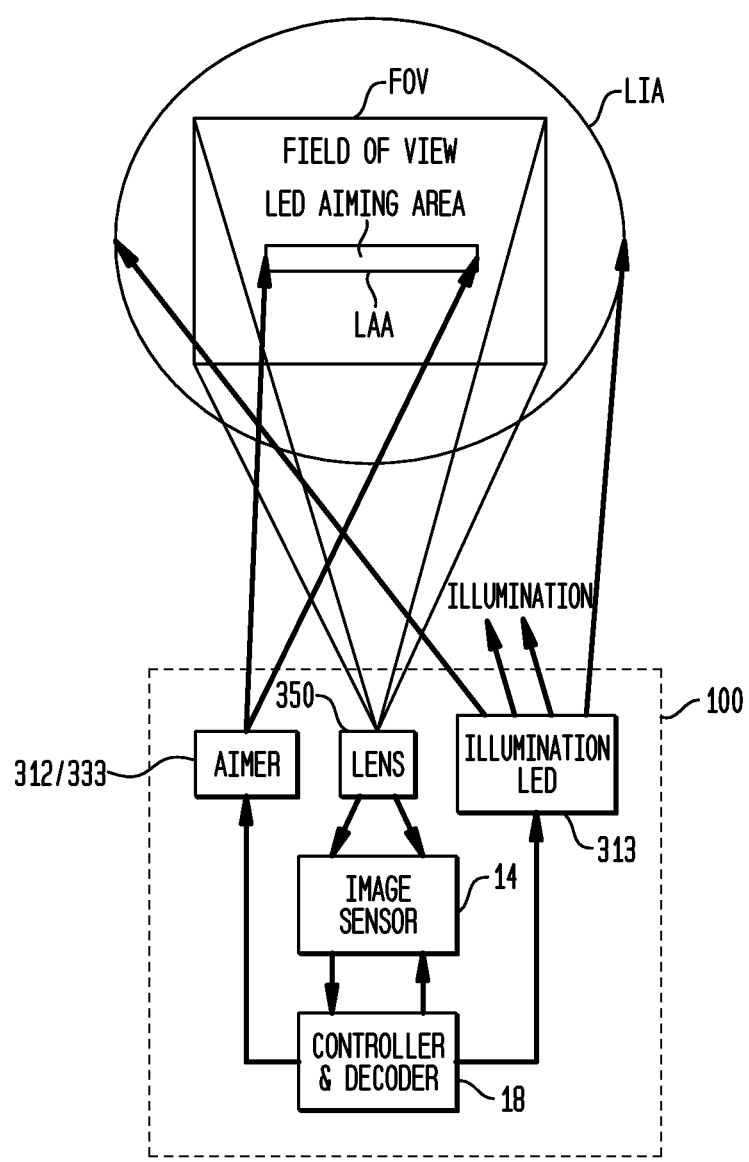
FIG. 8A is an exploded perspective view of a camera module according an exemplary embodiment of the disclosure.
FIG. 8E is a block diagram depicting the operation of the illumination and aiming systems of the I/D module according to an exemplary embodiment of the disclosure.

The illumination system PCB 310 includes an aiming lens 312, two illumination LEDs 313 (the illumination sources 16a), the illumination circuit 16b (not visible), and a temperature sensor 314 mounted on a forward facing surface 311 of the illumination system PCB 310. The illumination system PCB 310, aiming lens 312, illumination LEDs 313, illumination circuit 16b, and a temperature sensor 314 may form the earlier mentioned illumination system 16. The aiming lens 312 can include a cylindrical front surface $312_1$ and a cylindrical rear surface $312_2$ which is perpendicular to the front surface $312_1$ and which extends to the image sensor PCB 330 through a first aperture 315 in the illumination system PCB 310 and through an open portion of the camera body 320. The aiming lens 312 can be a plastic lens made for example, of a polycarbonate engineering plastic. As shown in FIG. 8B, the illumination LEDs 313 generate an LED illumination area LIA.

Referring again to FIG. 8A, the camera body 320 includes the top wall 321, a bottom wall 322, side walls 323 and 324, a cylindrical section 325 extending between the top and bottom walls 321, 322. The camera body 320 can be made from any suitable material, such as, but not limited to, plastic resin. An image focusing lens 350 is mounted in the cylindrical section 325 of the camera body 320 and extends through a second aperture 316 in the illumination PCB 310. The image focusing lens 350 can be a variable focus or fixed focus lens set.

The image sensor PCB 330 includes an aiming LED chip 333 and the image sensor 14 mounted on a forward facing surface 331 thereof, and a memory (not visible) mounted on a rearward facing surface thereof. The field of view (FOV) of the image sensor 14 (FIG. 8B) is disposed within the LED illumination area LIA generated by the illumination LEDs 313. The light produced by the aiming LED chip 333 impinges on the front and rear surfaces $312_1$, $312_2$ of the aiming lens 312. The surfaces $312_1$ and $312_2$ of the aiming lens 312 control the emission angle of the impinging light wherein surface $312_1$ focuses the light in a vertical direction and surface $312_2$ focuses the light in the horizontal direction. Accordingly, the aiming LED chip 333 produces a horizontally elongated LED aiming area LAA within the field of view FOV of the image sensor 14.

The image sensor 14 is aligned with the focusing lens 350, so that the lens 350 can focus light reflected back from the object onto the image sensor 14 which converts this light into a digital signal that contains data representing the image of the object. The image sensor 14 can comprise a CMOS image sensor, a CCD image sensor, or any other suitable image sensing device that is capable of converting the light reflected from the object into a digital signal that contains data that represents the image of the object. The structure and operation of such image sensors are well known in the art. An IR cutoff filter 336 can be disposed between the image sensor 14 and the image focusing lens 350, for removing infrared rays to improve visual quality. In one exemplary embodiment, the IR filter 336 is provided as a coating on a cover glass of the image sensor 14 to reduce the manufacturing cost of the I/D module 12.

The interconnect PCB 340 is disposed on the top wall 321 of the camera body 320 and electrically connects the illumination system PCB 310 with the image sensor PCB 330.

Figure 9:
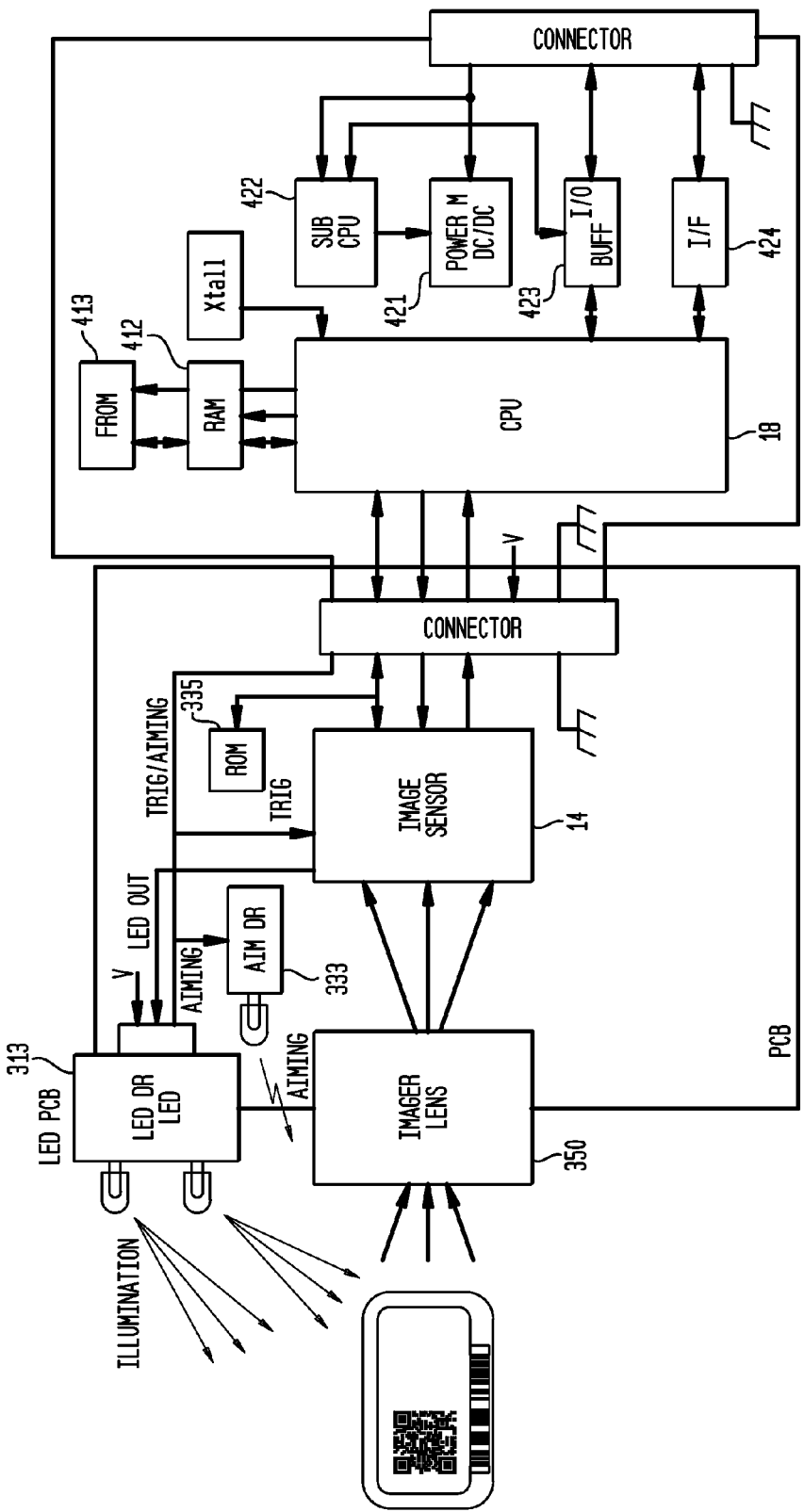
FIG. 9 is a block diagram of the camera module and a decoder module according to an exemplary embodiment of the disclosure.
Figure 10B:
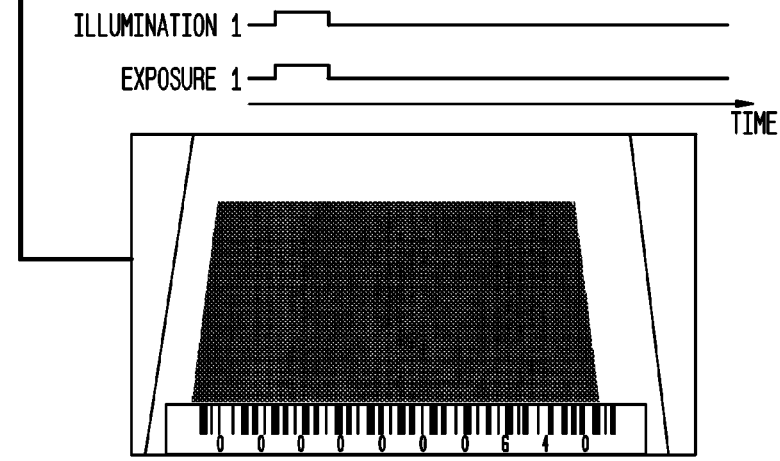
Figure 10C:
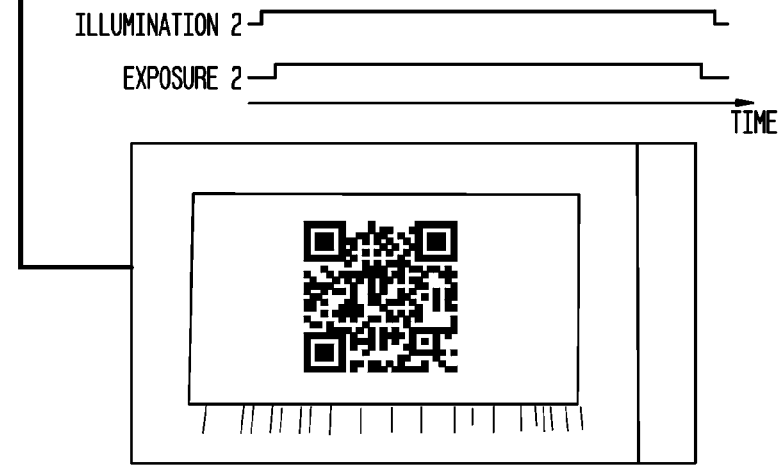
Figure 10D:
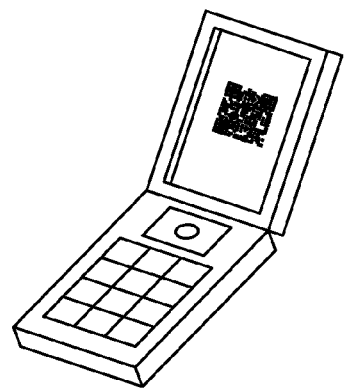
Figure 10E:
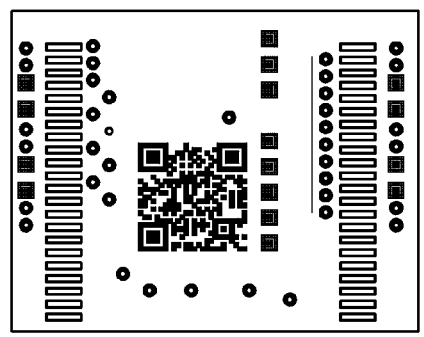
Figure 10F:
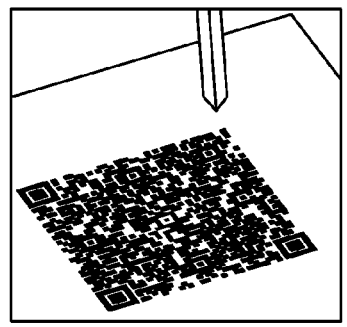
Figure 10G:
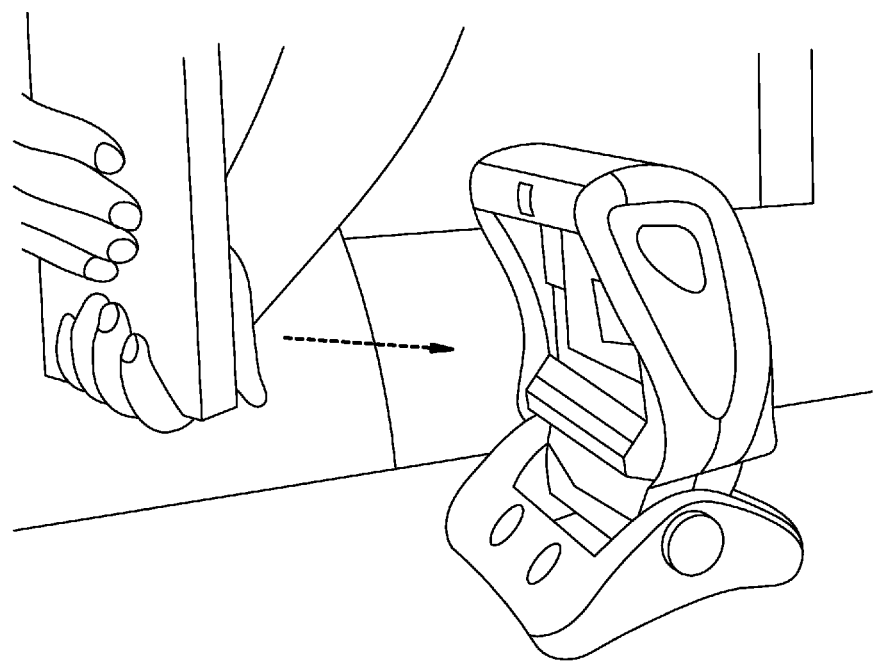
Figure 10H:
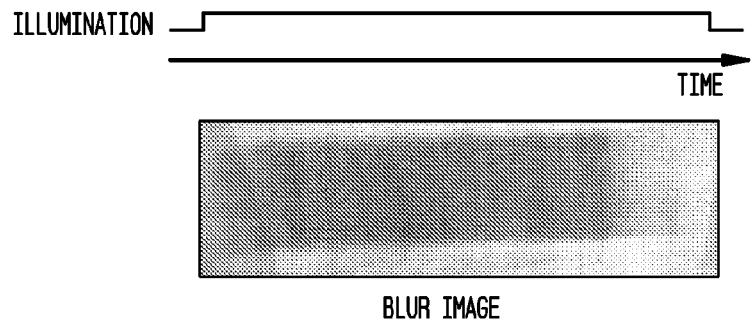
Figure 10I:
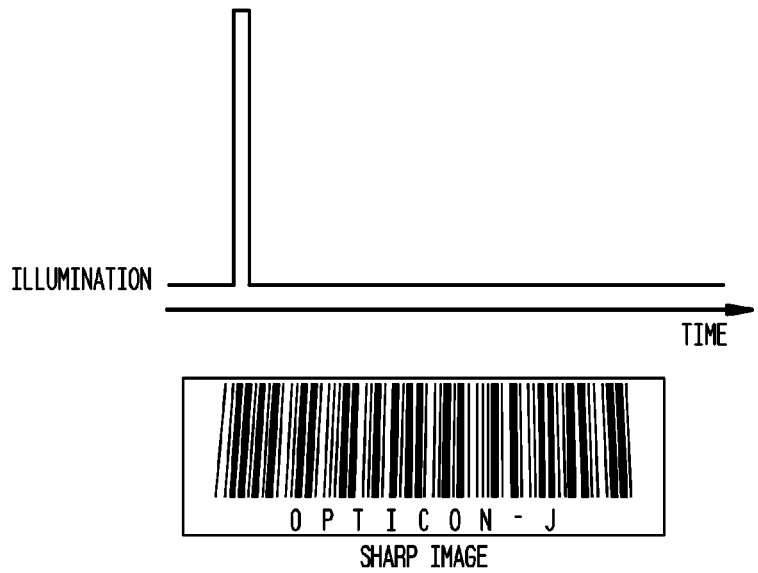
Figure 10J:
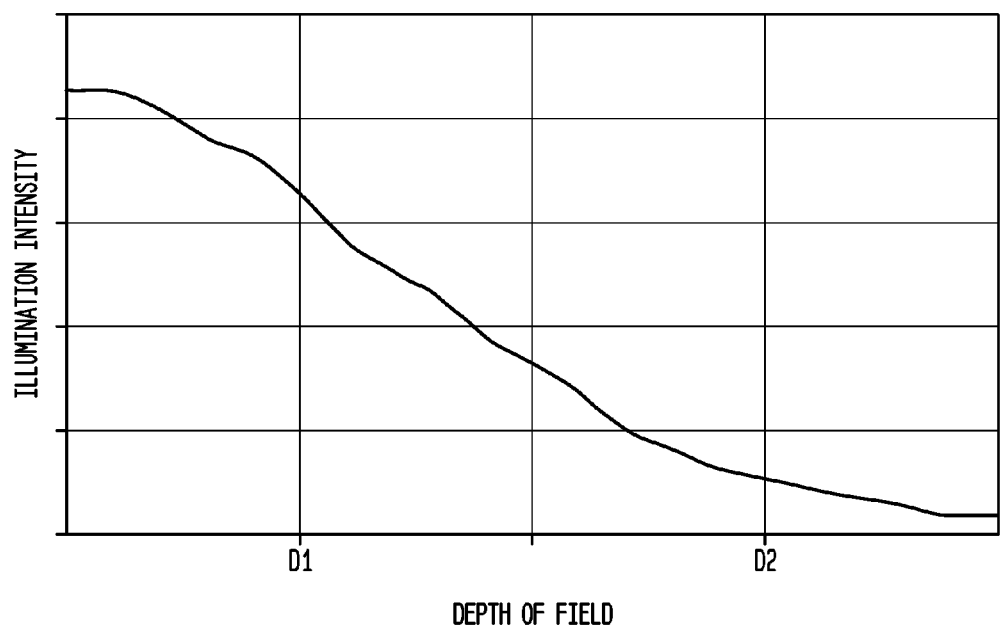
Figure 10K:
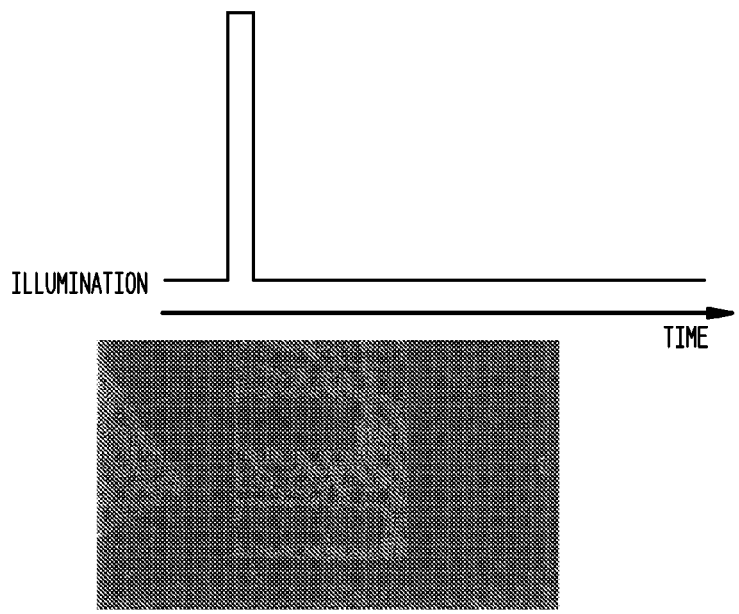
Figure 10L:
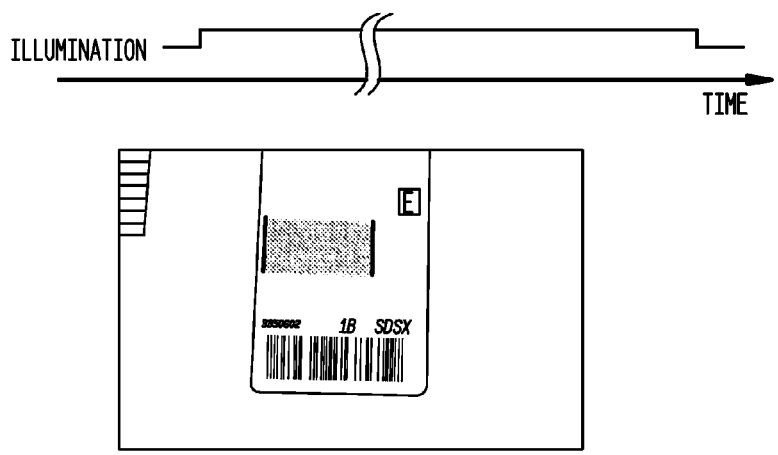

FIG. 9 is a block diagram of the camera module 300 described earlier and an exemplary embodiment of the decoder module 400. As shown therein, the decoder module includes a decoder PCB which includes the CPU 18 (controller/decoder) and first and second memories 412 and 413 (e.g., a random-access-memory (RAM) and a read-only-memory (ROM)), that operate together to control the image sensor 14 and illumination system 16. The decoder PCB can also include a module power supply 421, a power management control CPU 422, a buffer 423, and an interface 424.

While exemplary drawings and specific embodiments of the disclosure have been described and illustrated, it is to be understood that that the scope of the invention as set forth in the claims is not to be limited to the particular embodiments discussed. Thus, the embodiments shall be regarded as illustrative rather than restrictive, and it should be understood that variations may be made in those embodiments by persons skilled in the art without departing from the scope of the invention as set forth in the claims that follow and their structural and functional equivalents.

What is claimed is:

1. An image reading device comprising:
    an illumination system includes one or more illumination sources to produce illumination light and an illumination circuit to drive the illumination sources;
    an image sensor for capturing light reflected from a target illuminated with the illumination light during an exposure period; and
    a processor for controlling the illumination system, reading light data captured by the image sensor during a read-out period after the exposure period and decoding an image based on the light data during a decoding period after the read-out period;
    wherein the processor causes the illumination circuit of the illumination system to produce a first illumination light having a first intensity level continuously during a base illumination period that includes the exposure period and the read-out period by driving the one or more illumination sources, and a second illumination light having a second intensity level higher than the first intensity level during a pulsed illumination period having at least one pulse length in the base illumination period by overdriving the one or more illumination sources.

2. The image reading device according to claim 1, wherein the illumination circuit includes:
    a base current setting circuit for producing the first illumination light;
    a pulsed current setting circuit for producing the second illumination light;
    a first switch for connecting or disconnecting between the base current setting circuit and a DC power source and between the pulsed current setting circuit and the DC power source; and
    a second switch for connecting or disconnecting between the pulsed current setting circuit and the illumination sources;
    wherein the processor controls ON/OFF functionality of the first switch and the second switch.

3. The image reading device according to claim 1, wherein the processor causes the illumination circuit to start the base illumination period before starting the exposure period and to start the pulsed illumination period after starting the exposure period.

4. The image reading device according to claim 3, wherein the processor causes the illumination circuit to terminate the first sub-illumination period when decoding of the image is successful.

5. The image reading device according to claim 1, wherein the processor causes the illumination circuit to start the base illumination period and the pulsed illumination period with starting the exposure period simultaneously.

6. The image reading device according to claim 5, wherein the processor causes the illumination circuit to terminate the first sub-illumination period when decoding of the image is successful.

* * * * *